US012615362B2

(12) United States Patent
Le Leannec et al.

(10) Patent No.: US 12,615,362 B2
(45) Date of Patent: Apr. 28, 2026

(54) VVC NORMATIVE AND ENCODER-SIDE ADAPTATIONS FOR ABT

(71) Applicant: INTERDIGITAL CE PATENT HOLDINGS, SAS, Paris (FR)

(72) Inventors: Fabrice Le Leannec, Betton (FR); Karam Naser, Mouazé (FR); Thierry Dumas, Rennes (FR); Antoine Robert, Mézières sur Couesnon (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 10 days.

(21) Appl. No.: 18/555,673

(22) PCT Filed: Apr. 7, 2022

(86) PCT No.: PCT/EP2022/059338
§ 371 (c)(1),
(2) Date: Oct. 16, 2023

(87) PCT Pub. No.: WO2022/223312
PCT Pub. Date: Oct. 27, 2022

(65) Prior Publication Data
US 2024/0214569 A1      Jun. 27, 2024

(30) Foreign Application Priority Data

Apr. 19, 2021    (EP) ..................................... 21305514
Sep. 14, 2021    (EP) ..................................... 21306266

(51) Int. Cl.
*H04N 19/119*        (2014.01)
*H04N 19/176*        (2014.01)

(52) U.S. Cl.
CPC ......... *H04N 19/119* (2014.11); *H04N 19/176* (2014.11)

(58) Field of Classification Search
CPC ...... H04N 19/96; H04N 19/70; H04N 19/119; H04N 19/134; H04N 19/61; H04N 19/157; H04N 19/176
See application file for complete search history.

(56) References Cited

U.S. PATENT DOCUMENTS 11,516,513 B2 * 11/2022 Chen ....................... H04N 19/70
2019/0335172 A1 * 10/2019 Zhao .................... H04N 19/119
(Continued)

FOREIGN PATENT DOCUMENTS

WO        2019245841        12/2019
WO        WO-2019236335 A1 * 12/2019 ............. H04N 19/96

OTHER PUBLICATIONS

Bordes et al., Description of SDR, HDR and 360 Video Coding Technology Proposal by Qualcomm and Technicolor—Medium Complexity Version, Joint Video Experts Team (JVET) of ITU-T SG 16 WP 3 and ISO/IEC JTC 1/SC 29/WG 11, 10th Meeting, San Diego, US, Apr. 10-20, 2018, Document: JVET-J0022.
(Continued)

*Primary Examiner* — Tsion B Owens
(74) *Attorney, Agent, or Firm* — Condo Roccia Koptiw LLP

(57) ABSTRACT

Some series of ABT split are normatively forbidden in order to limit the number of allowed series of splits, in a way that refines the trade-offs between the amount of allowed split series and the compression efficiency. In particular, a reduced combinatory in terms of allowed split series leads to reduced encoder-side complexity, in the rate distortion search for the best block partitioning. The normative split restrictions provide that when successively using horizontal or vertical then vertical or horizontal asymmetric splits, the considered succession of two splits leads to isolating the sub-area of the input block that is three-fourths the size of the parent block in width and height. Additional embodi-
(Continued)

ments condition allowed splits on transform size, block size, and temporal layer of the slice and slice type.

17 Claims, 29 Drawing Sheets

(56)                References Cited

U.S. PATENT DOCUMENTS

| 2021/0014536 | A1* | 1/2021 | Chen | H04N 19/96 |
|---|---|---|---|---|
| 2022/0264087 | A1* | 8/2022 | Zhang | H04N 19/105 |
| 2023/0171437 | A1* | 6/2023 | Gao | H04N 19/119 |
| 2023/0269372 | A1* | 8/2023 | Lim | H04N 19/1883 |
| | | | | 375/240.02 |
| 2023/0308688 | A1* | 9/2023 | Panusopone | H04N 19/13 |
| 2024/0244275 | A1* | 7/2024 | Gao | H04N 19/176 |
| 2025/0247535 | A1* | 7/2025 | Yan | H04N 19/12 |

OTHER PUBLICATIONS

Chen et al., "Description of SDR, HDR and 360 Video Coding by Qualcomm and Technicolor—Low and High Complexity Versions", Joint Video Exploration Team (JVET) of ITU-T SG 16 WP 3 and ISO/IEC JTC 1/SC 29/WG 11, Document: JVET-J0021, 10th Meeting: San Diego, US, Apr. 10, 2018, 43 pages.

Ma et al., Quadtree Plus Binary Tree With Shifting (Including Software), Joint Video Exploration Team (JVET) of ITU-T SG 16 WP 3 and ISO/IEC JTC 1/SC 29/WG11, 10th Meeting: San Diego, US, Apr. 10-20, 2018, Document: JVET-J0035-V4.

Chen et al., Algorithm Description of Joint Exploration Test Model 3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, Document: JVET- C1001_v3.

Le Leannec et al., "Asymmetric Coding Units in QTBT", Joint Video Exploration Team (JVET) of ITU-T SG 16 WP 3 and ISO/IEC JTC 1/SC 29/WG 11, Document No. JVET-D0064, 4th Meeting, Chengdu, China, Oct. 15, 2016, 10 pages.

Toma et al., "Description of SDR Video Coding Technology Proposal by Panasonic", Joint Video Experts Team (JVET) of ITU-T SG16 WP3 and ISO/IEC JTC 1/SC 29/WG 11, Document: JVET-J0020-v1, 10th Meeting: San Diego, California, USA, Apr. 10, 2018, 75 pages.

Chen et al., "Description of SDR, HDR and 360 Video Coding Technology Proposal by Huawei, GoPro, HiSilicon, and Samsung", Joint Video Exploration Team (JVET) of ITU-T SG 16 WP 3 and ISO/IEC JTC 1/SC 29/WG 11, Document: JVET-J0025_v2, 10th Meeting, San Diego, CA, United States, Apr. 10-20, 2018, 132 pages.

Chuang et al., CE1-Related: Separate Tree Partitioning at 64x64-luma/32x32-chroma Unit Level, Joint Video Experts Team (JVET) of ITU-T SG 16 WP 3 and ISO/IEC JTC 1/SC 29/WG 11th Meeting, Ljubljana, SI, Jul. 10-18, 2018, Document: JVET-K0230-V1.

Hisu, et al., "CE1-Related: Constraint for Binary and Ternary Partitions", JVET of ITU-T SG 16 WP 3 and ISO/IEC JTC 1/SC 29/WG 11, 11th Meeting: Ljubljana, SI, Jul. 10-18, 2018, Document: JVET-K0556-v2, 4 pages.

Bross et al., "Versatile Video Coding (Draft 10)", Joint Video Experts Team (JVET) of ITU-T SG 16 WP 3 and ISO/IEC JTC 1/SC 29/WG 11, Document JVET-S2001_vG, 19th meeting, by teleconference, Jun. 22, 2020, 544 pages.

Eleannec et al., "CE1: Asymmetric Binary Tree (tests 1.0.1, 1.0.2, 1.0.3, 1.0.4, 8.0.1 and 8.0.2)", Joint Video Experts Team (JVET) of ITU-T SG 16 WP 3 and ISO/IEC JTC 1/SC 29/WG 11, Document: JVET-K0197-v2, 11th Meeting, Ljubljana, Slovenia, Jul. 10, 2018, 20 pages.

Bordes et al., "Description of SDR, HDR and 360° Video Coding Technology Proposal by Qualcomm and Technicolor—Medium Complexity Version", Joint Video Experts Team (JVET) of ITU-T SG 16 WP3 and ISO/IEC JTC 1/SC 29/WG 11, Document JVET-J0022r1, 10th Meeting, San Diego, California, USA, Apr. 10, 2018, 83 pages.

"High Efficiency Video Coding", ITU-T H.265 Telecommunication Standardization Sector of ITU (Oct. 2014); Series H: Audiovisual and Multimedia SYSTEMSInfrastructure of audiovisual services—Coding of moving, 514 pages.

Misra et al., "Description of SDR and HDR Video Coding Technology Proposal by Sharp and Foxconn", Joint Video Exploration Team (JVET) of ITU-T SG 16 WP3 and ISO/IEC JTC 1/SC 29/WG 11, Document: JVET-J0026r1, 10th Meeting, San Diego, California, United States, Apr. 10, 2018, 70 pages.

Hsu et al., "Description of SDR Video Coding Technology Proposal by MediaTek", Joint Video Experts Team (JVET) of ITU-T SG 16 WP3 and ISO/IEC JTC 1/SC 29/WG 11, Document JVET-J0018, 10th Meeting, San Diego, CA, United States, Apr. 10, 2018, 64 pages.

Bross et al., Versatile Video Coding (Draft 10), Joint Video Experts Team (JVET) of ITU-T SG 16 WP 3 and ISO/IEC JTC 1/SC 29/WG 11, Document JVET-S2001_vA, 19th meeting, by teleconference, Jun. 22, 2020, 503 pages.

* cited by examiner

HOR_TRIPLE               VER_TRIPLE

VER_TRIPLE

HOR_TRIPLE

VER

HOR

QT_SPLIT

NO_SPLIT

Current Chroma CU

Template Used for LMCS in Proposal

CTU Width =128

CTU Height=128

2400

Start ⟶ 2401

Determining a Split Mode for Encoding a Parent Coding Unit ⟶ 2410

Determining an Index of a Sub-block ⟶ 2420

Determining whether a Split Mode is Allowed ⟶ 2430

Encoding the Parent Coding Unit using an Allowed Split Mode ⟶ 2440

VVC NORMATIVE AND ENCODER-SIDE ADAPTATIONS FOR ABT

CROSS REFERENCE TO RELATED APPLICATIONS

This application is a U.S. National Stage Application under 35 U.S.C. 371 of International Patent Application No. PCT/EP2022/059338, filed Apr. 7, 2022, which is incorporated herein by reference in its entirety.

This application claims the benefit of European Application Nos. 21305514.8, filed Apr. 19, 2021 and application Ser. No. 21/306,266.4 filed Sep. 14, 2021, which is incorporated herein by reference in its entirety.

TECHNICAL FIELD

At least one of the present embodiments generally relates to a method or an apparatus for video encoding or decoding, compression or decompression.

BACKGROUND

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

SUMMARY

At least one of the present embodiments generally relates to a method or an apparatus for video encoding or decoding, and more particularly, to a method or an apparatus for using asymmetric binary trees with sub-block based coding tools, as in the VVC (Versatile Video Coding or H.266) standard.

According to a first aspect, there is provided a method. The method comprises steps for determining a split mode for encoding a parent coding unit; determining an index of a sub-block of the parent coding unit; determining whether a split mode is allowed based on factors comprising the split mode for the parent coding unit and the index of the sub-block of the parent coding unit; and, encoding the parent coding unit using a split mode that is allowed.

According to a second aspect, there is provided a method. The method comprises steps for determining a split mode for decoding a parent coding unit; determining an index of a sub-block of the parent coding unit; determining whether a split mode is allowed based on factors comprising the split mode for the parent coding unit and the index of the sub-block of the parent coding unit; and, decoding the parent coding unit using a split mode that is allowed According to another aspect, there is provided an apparatus. The apparatus comprises a processor. The processor can be configured to encode a block of a video or decode a bitstream by executing any of the aforementioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the general aspects will become apparent from the following detailed description of exemplary embodiments, which is to be read in connection with the accompanying drawings.

DETAILED DESCRIPTION

The embodiments described here are in the field of video compression and generally relate to video compression and video encoding and decoding more specifically the embodiments aim at improved compression efficiency compared to existing standard video compression systems.

To achieve high compression efficiency, image and video coding schemes usually employ prediction, including motion vector prediction, and transform to leverage spatial and temporal redundancy in the video content. Generally, intra or inter prediction is used to exploit the intra or inter frame correlation, then the differences between the original image and the predicted image, often denoted as prediction errors or prediction residuals, are transformed, quantized, and entropy coded. To reconstruct the video, the compressed data are decoded by inverse processes corresponding to the entropy coding, quantization, transform, and prediction.

In the HEVC (High Efficiency Video Coding, ISO/IEC 23008-2, ITU-T H.265) video compression standard, a picture is divided into so-called Coding Tree Units (CTU), with typical sizes of 64×64, 128×128, or 256×256.

Figure 1:
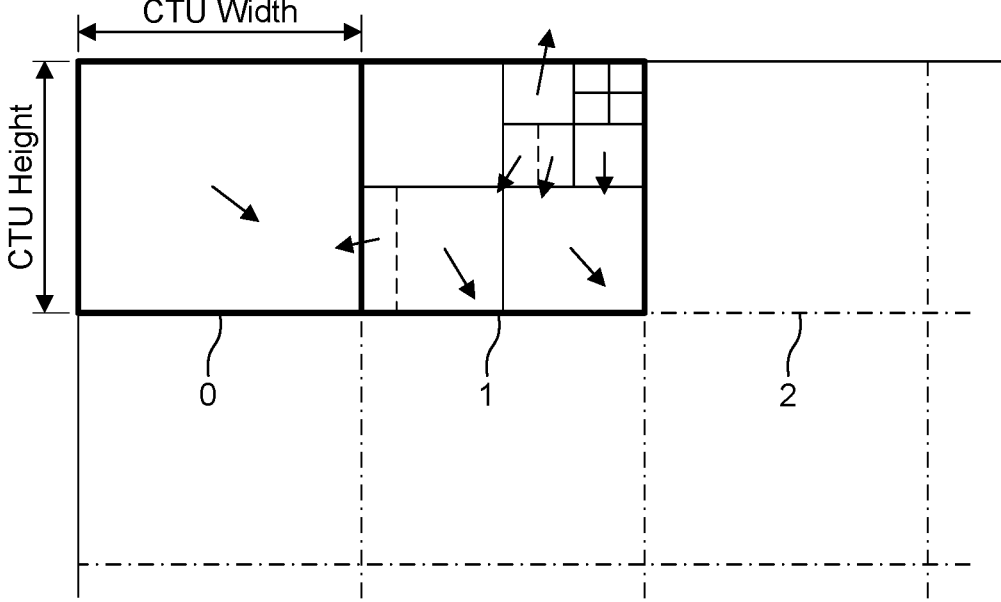
FIG. 1 shows Coding Tree Unit and Coding Tree concepts to represent a compressed HEVC picture.

Each Coding Tree Unit (CTU) is represented by a Coding Tree in the compressed domain. This is a quad-tree division of the CTU, where each leaf is called a Coding Unit (CU), as shown in FIG. 1.

Figure 2:
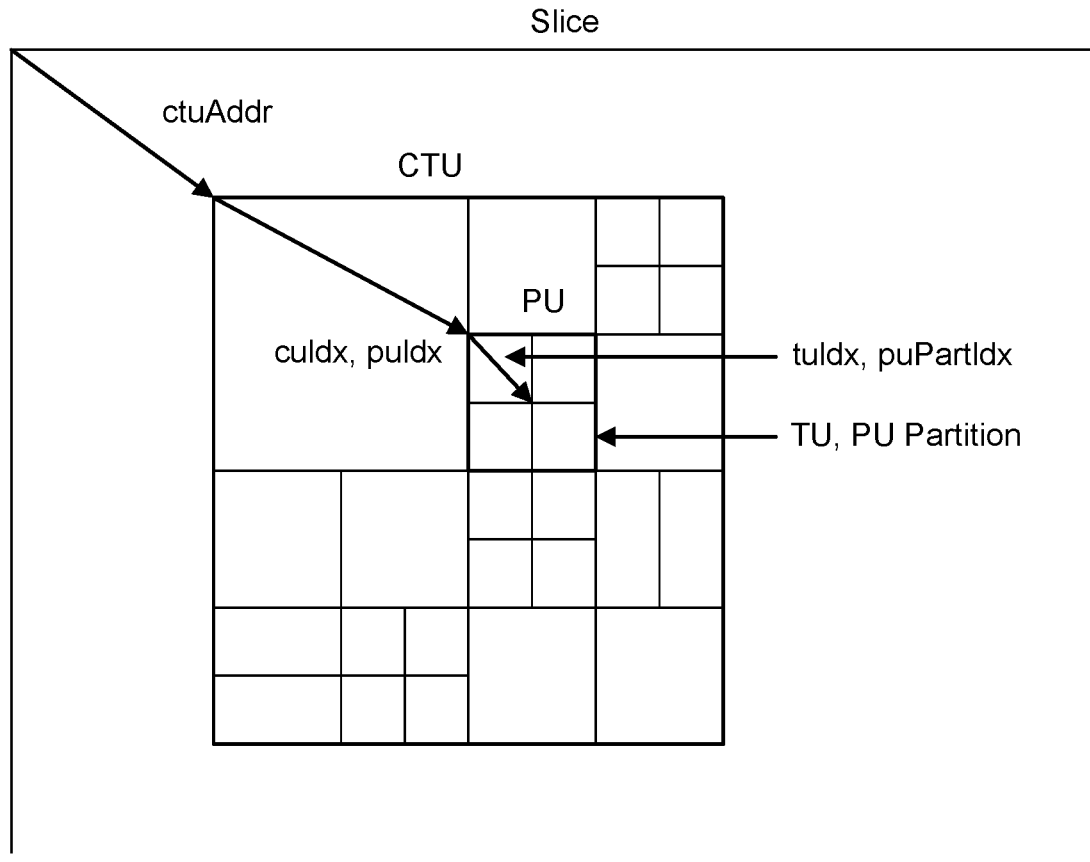
FIG. 2 shows an example division of a Coding Tree Unit into Coding Units, Prediction Units and Transform Units.

Each CU is then given some Intra or Inter prediction parameters (Prediction Info). To do so, it is spatially partitioned into one or more Prediction Units (PUs), each PU being assigned some prediction information. A motion vector is associated to each prediction unit (PU). The Intra or Inter coding mode is assigned on the CU level, as shown in FIG. 2.

Figure 3:
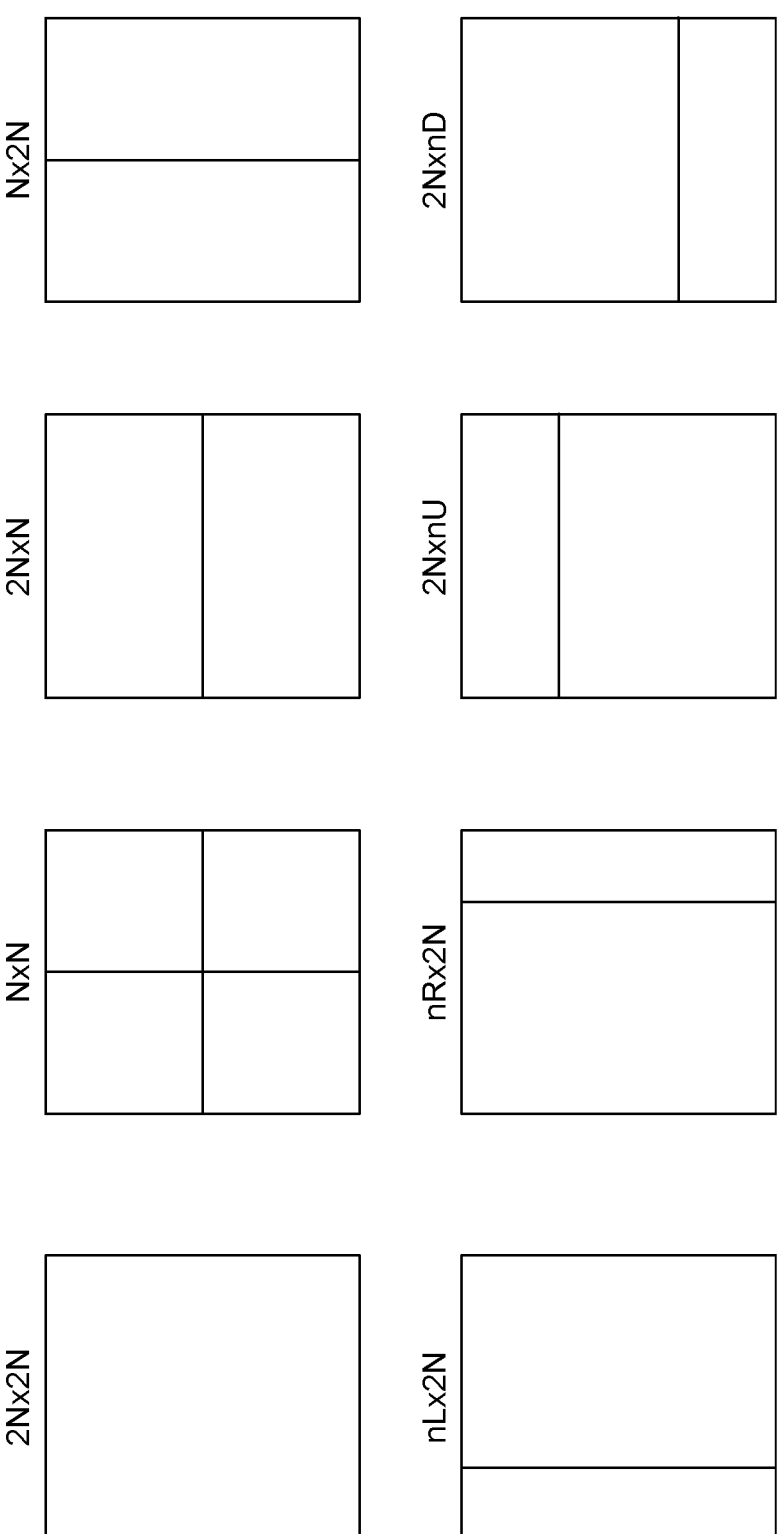
FIG. 3 shows partitioning of coding units into prediction units.

The Partitioning of a Coding Unit into Prediction Unit(s) is done according to the partition type, signaled in the bit-stream. For Intra coding unit, only the partition types 2N×2N and N×N, illustrated in FIG. 3, are used. This means only square Prediction Units are used in Intra Coding Units.

On the contrary, Inter Coding Units can use all partition types shown in FIG. 3.

According to the HEVC standard, Coding Units are also divided into so-called transform units, in a recursive way, following a "transform tree". Thus, a transform tree is a quad-tree division of a coding unit, and transform units are the leaf of the transform tree. A transform unit encapsulates the square transform blocks of each picture component corresponding to a considered square spatial area. A transform block is a square block of samples in a single component, where the same transform is applied.

New emerging video compression tools of VVC include a Coding Tree Unit representation in the compressed domain in order to represent picture data in a more flexible way in the compressed domain. The advantage of this flexible representation of the coding tree is that it provides increased compression efficiency compared to the CU/PU/TU arrangement of the HEVC standard.

Figure 4:
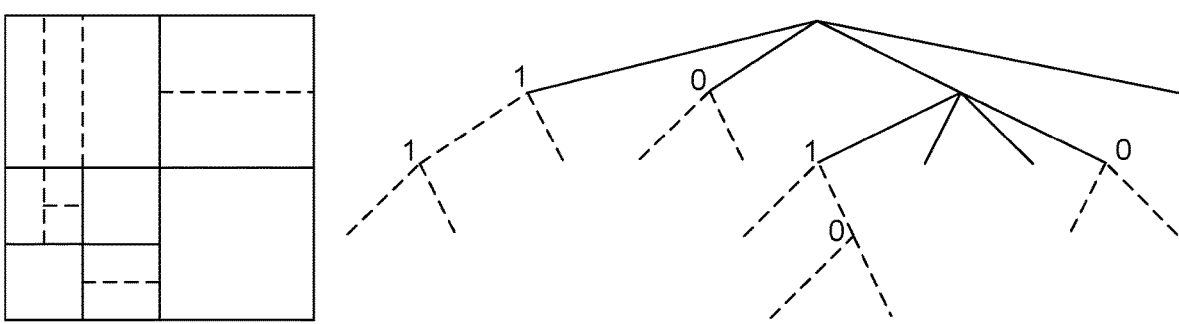
FIG. 4 shows an example of Quad-Tree Plus Binary-Tree (QTBT) CTU representation.

The Quad-Tree plus Binary-Tree (QTBT) coding tool provides this increased flexibility. It consists in a coding tree where coding units can be split both in a quad-tree and in a binary-tree fashion. Such coding tree representation of a Coding Tree Unit is illustrated in FIG. 4.

The splitting of a coding unit is decided on the encoder side through a rate distortion optimization procedure, which consists in determining the QTBT representation of the CTU with minimal rate distortion cost.

In the QTBT technology, a CU has either square or rectangular shape. The size of coding unit is always a power of 2, and typically goes from 4 to 128.

In addition to this variety of rectangular shapes for a coding unit, this new CTU representation has the following different characteristics compared to HEVC.

The QTBT decomposition of a CTU is made of two stages: first the CTU is split in a quad-tree fashion, then each quad-tree leaf can be further divide in a binary fashion. This is illustrated on the right of FIG. 4 where solid lines represent the quad-tree decomposition phase and dashed lines represent the binary decomposition that is spatially embedded in the quad-tree leaves.

In intra slices, the Luma and Chroma block partitioning structure is separated, and decided independently.

No more CU partitioning into predictions units or transform unit is employed. In other words, each Coding Unit is systematically made of a single prediction unit (previously 2N×2N prediction unit partition type) and single transform unit (no division into a transform tree).

For most coding units in VVC draft 6, for most CU coding modes, no more CU partitioning into predictions units or transform unit is employed. In other words, each Coding Unit is systematically made of a single prediction unit (2N×2N prediction unit partition type) and single transform unit (no division into a transform tree). This is true for all VVC coding units except in 4 specific coding modes of VVC draft 6, where the following PU or TU partitioning applies.

In the case of a CU larger than 64 in width or height, a tiling of the CU into TU of size equal to the maximum supported transform size is performed. Typically, the maximum transform size may be equal to 64.

In the case of an intra CU coded in ISP (intra sub-partition) mode, the CU is split into 2 or 4 transform units, depending on the type of ISP mode used and the shape of the CU.

In the case of an inter CU coded in SBT (sub-block transform) mode, the CU is split into 2 transform units, one of the resulting TU having necessarily residual data equal to zero.

In the case of an inter CU coded in Triangle Prediction Merge (TPM) mode, the CU is made of 2 triangular prediction units, each PU being assigned its own motion data.

Figure 5:
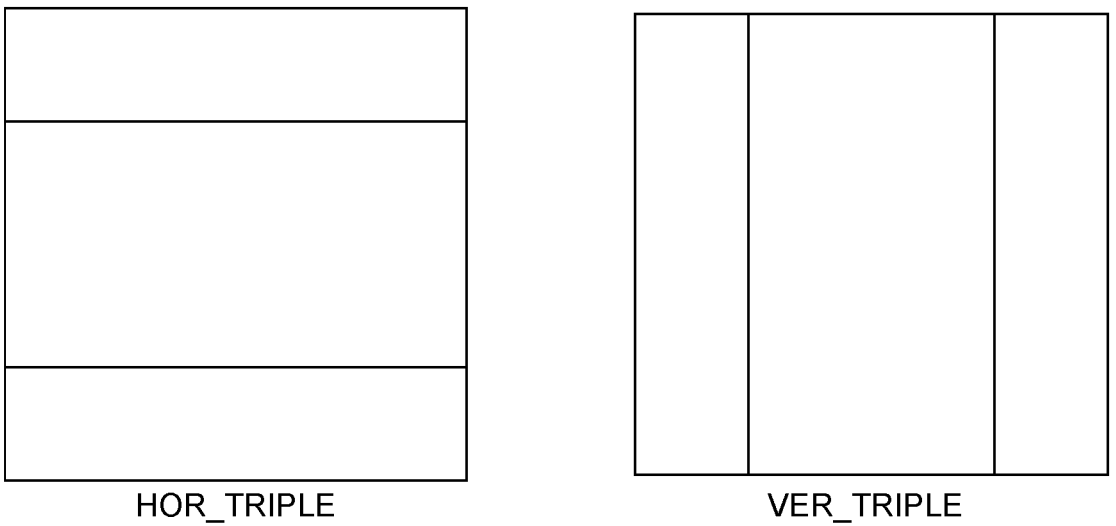
FIG. 5 shows horizontal (left) and vertical (right) Triple Tree Coding Unit splitting modes.

An additional CU split mode adopted in the VVC (Versatile Video Coding) video compression standard, called the horizontal or vertical triple tree splitting mode, consists in dividing a coding unit (CU) into 3 sub-coding-units (sub-CUs), with respective sizes equal to $\frac{1}{4}$, $\frac{1}{2}$ and $\frac{1}{4}$ of the parent CU size in the direction of the considered spatial division. This is illustrated in FIG. 5.

Figure 6:
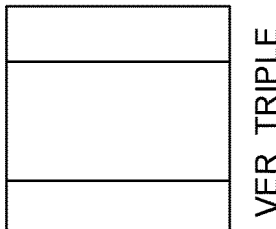
FIG. 6 shows a set of all Coding Unit splitting modes supported in the video coding scheme considered in the description.
Figure 6:
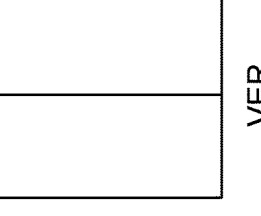
Figure 6:
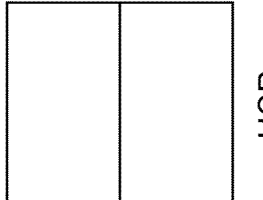
Figure 6:
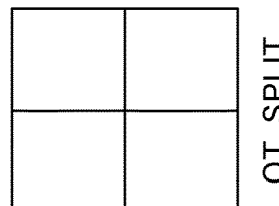
Figure 6:
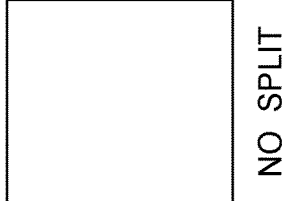
Figure 7:
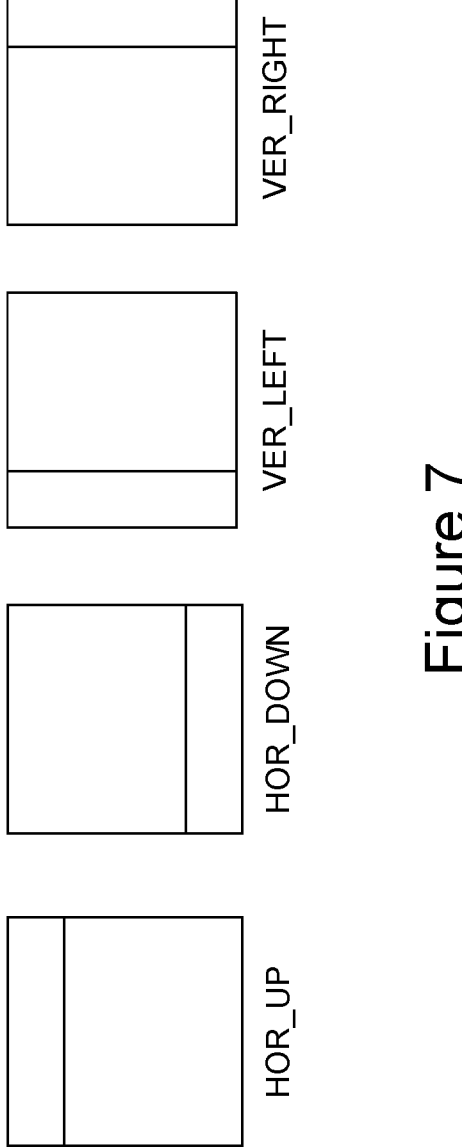
FIG. 7 shows additional CU binary asymmetric splitting modes introduced by the ABT (Asymmetric Binary Tree) coding tool.

The complete set of CU splitting modes present in such codec are shown in FIG. 6.

In another disclosure, it is proposed to introduce Coding Units with new rectangular shapes, which result from a new Binary Splitting Mode called asymmetric splitting mode.

This means new rectangular CU shapes are added. These new shapes consist in sizes equal to $3 \cdot 2^n$ in width and/or height. Furthermore, a CU with a size multiple of 3 in width or height can be further split in a binary fashion, horizontally or vertically.

As a consequence, a square coding unit with size (w, h) (width and height) that would be split through one of the proposed asymmetric binary splitting modes, for example HOR_UP (horizontal-up), would lead to 2 sub-coding units with respective rectangular sizes $$\left(w, \frac{h}{4}\right) \text{ and } \left(w, \frac{3h}{4}\right).$$

Figure 8:
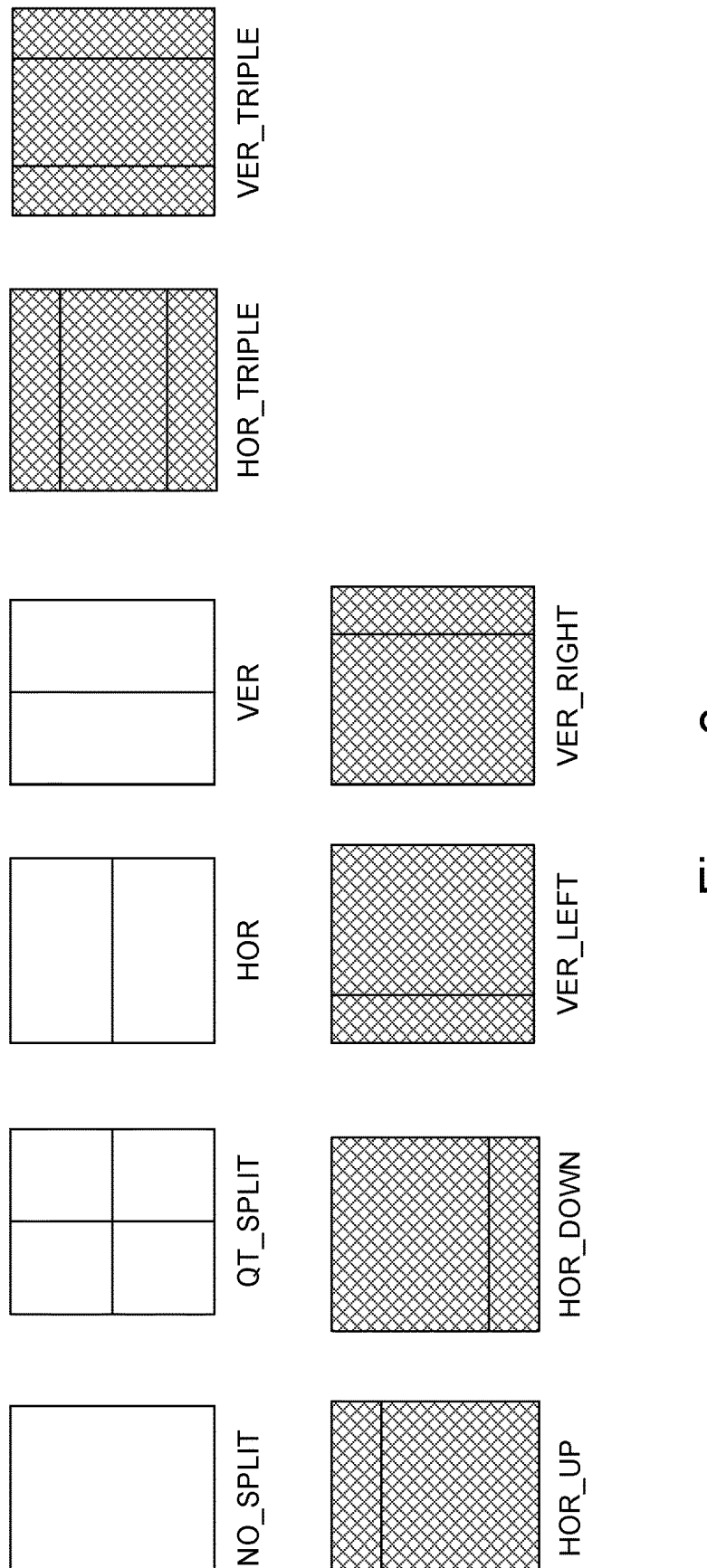
FIG. 8 shows an extended set of possible CU split modes, including the horizontal and vertical triple tree split mode.

When using all split modes from VVC and all ABT (Asymmetric Binary Tree) split modes, the set of possible partitions supported in the envisioned coding scheme is given in FIG. 8. Triple tree consists in splitting a CU into tree sub-CU with size ($\frac{1}{4}$, $\frac{1}{2}$, $\frac{1}{4}$) relative to the parent CU, in the considered orientation.

Figure 9:
FIG. 9 shows an example of coding structures chosen to encode an exemplary picture, including a Quad-Tree decomposition of CTUs and Binary-Tree decomposition that is embedded into the quad tree.

FIG. 9 illustrates the coding units chosen by the encoder. One sees that triple tree and asymmetric binary tree split modes are often used in this exemplary picture. One also notes that these additional coding unit topologies help in having coding structures that spatially match the structures and discontinuities contained in the original signal.

The described embodiments propose some adaptations of some VVC coding tools, when introducing the Asymmetric Binary Tree (ABT) split modes on top of the VVC draft 10 compression system.

These adaptations include the synergy of ABT with coding tools contained in the VTM which were not contained in the coding schemes contained in JEM3, JVET-J0022.

One problem solved by the described embodiments is to adapt some VVC normative and non-normative aspects, so as to optimize the complexity/compression efficiency trade-off when introducing ABT on top of the VVC coded.

This description proposes several aspects related to the management of the ABT partitioning, including normative and non-normative ones. The list of proposed adaptation comprises:

Normative or non-normative restrictions on some succession of ABT splits.

Normative or non-normative configuration of supported transform sizes linked to ABT partitioning.

Increased syntax to support the specification of maximum block sizes where ABT split is allowed and associated semantics.

Adapted normative rules for LMCS chroma scaling parameter derivation.

Adapted normative rules linked to an increased maximum transform size compared to VVC.

New rate distortion search method on the encoder side to bypass some ABT splits evaluation, to optimize the tradeoff between encoder side complexity and compression efficiency.

Figure 10:
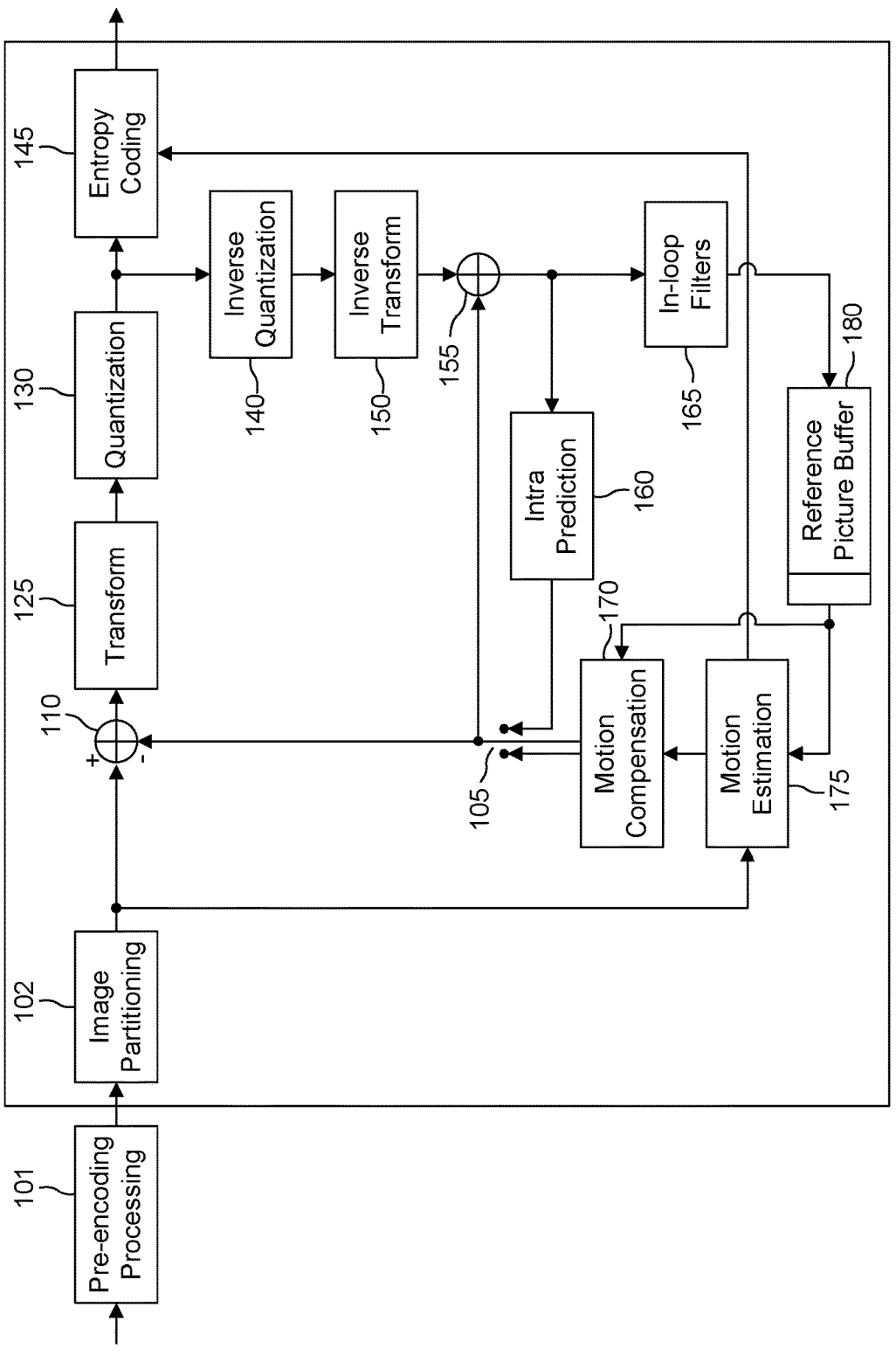
FIG. 10 shows a standard, generic video compression scheme.
Figure 11:
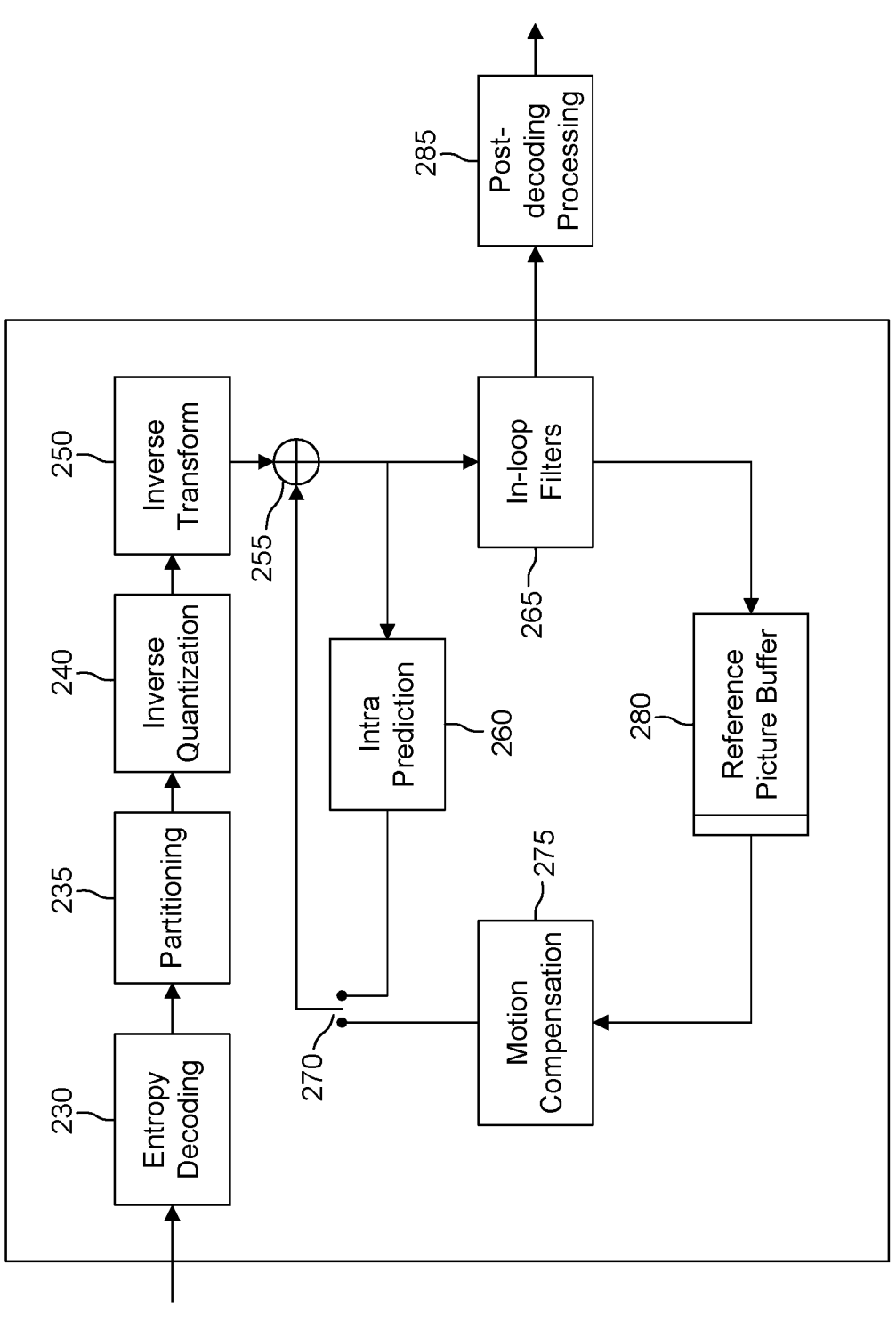
FIG. 11 shows a standard, generic video decompression scheme.

The impacted modes of FIGS. 10 and 11 comprise The impacted encoder modules are coding modules 102, 125, 130, 160 170 of FIG. 10. The impacted decoder modules are the decoding modules 230, 235, 240, 250, 260 and 275 of FIG. 11.

Normative Restrictions/Configurations on ABT Usage

This section depicts an embodiment, to further improve the trade-off between complexity and coding efficiency when using ABT partitioning.

Figure 12:
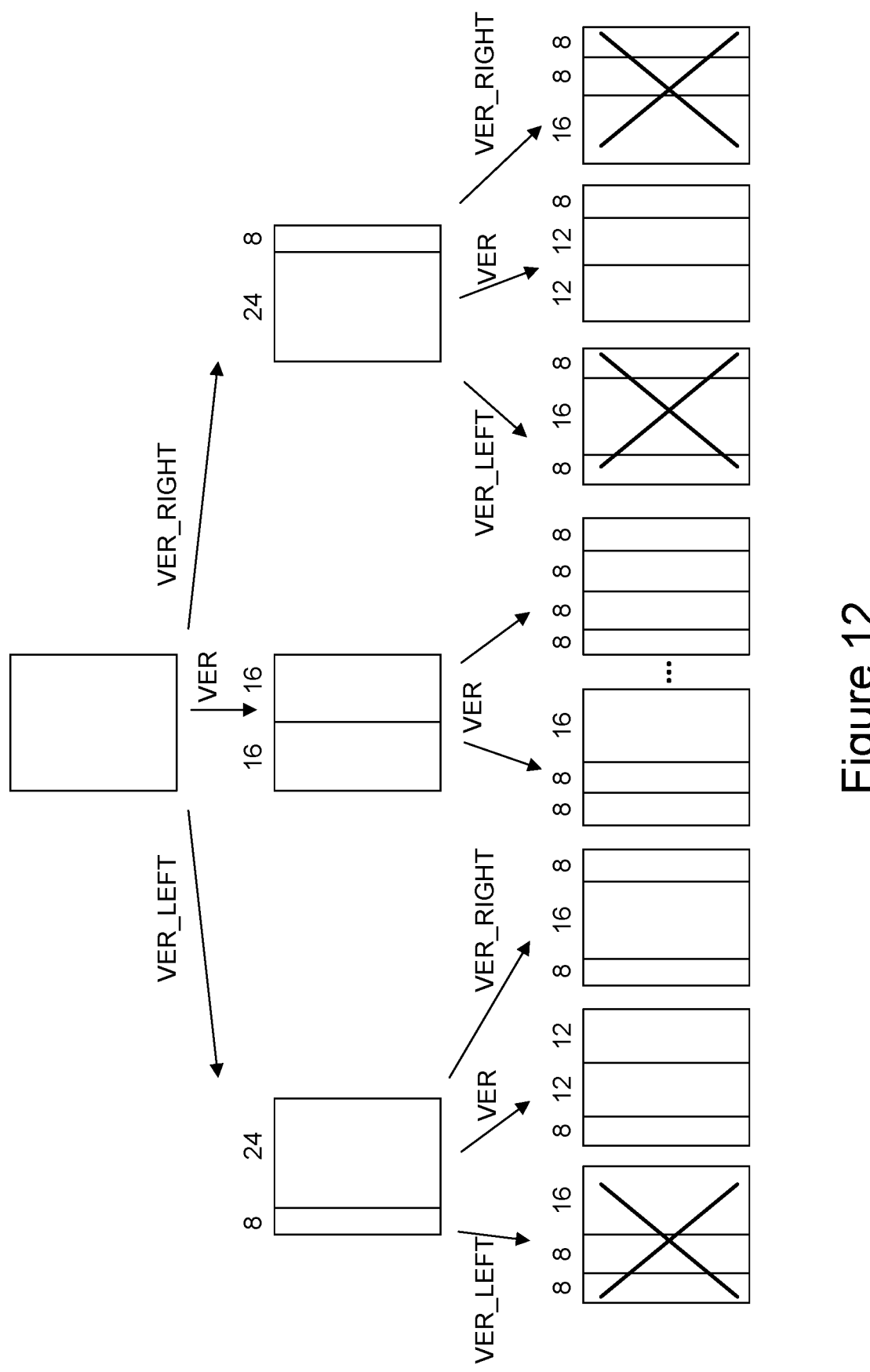
FIG. 12 illustrates Restriction to avoid redundancies between asymmetric and symmetric binary trees
Figure 13:
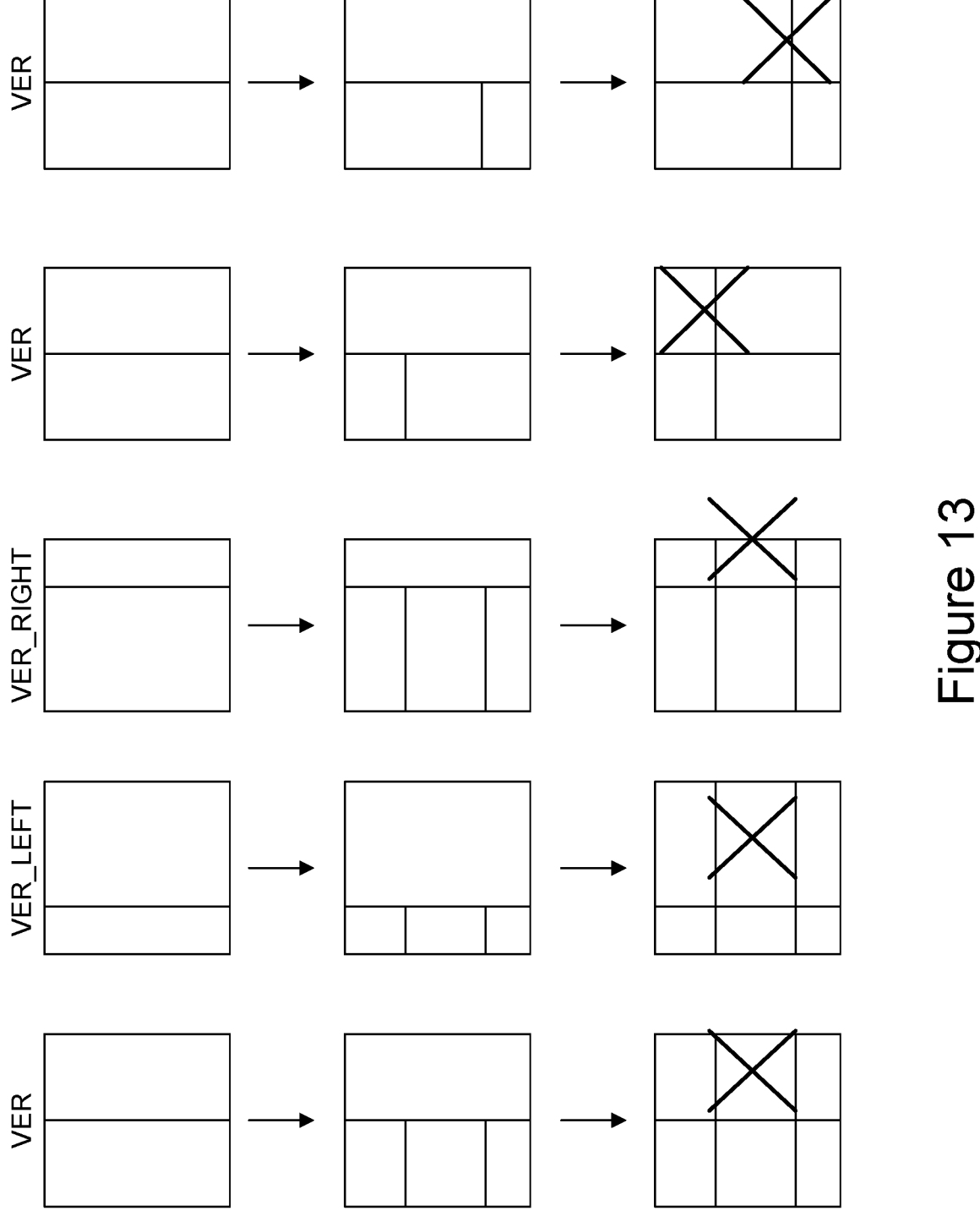
FIG. 13 illustrates allowed and disallowed series of splits as described in JVET-J0022

First, as depicted in JVET-J0022 contribution, some successions of split modes between BT (Binary Tree), TT (Ternary Tree) and ABT (Asymmetric Binary Tree) splits are normatively forbidden, because they lead to strictly the same block division as some allowed succession of splits in a considered picture area. The forbidden and allow successions of splits as described in JVET-J0022 are described in FIG. 12 and FIG. 13.

Figure 14:
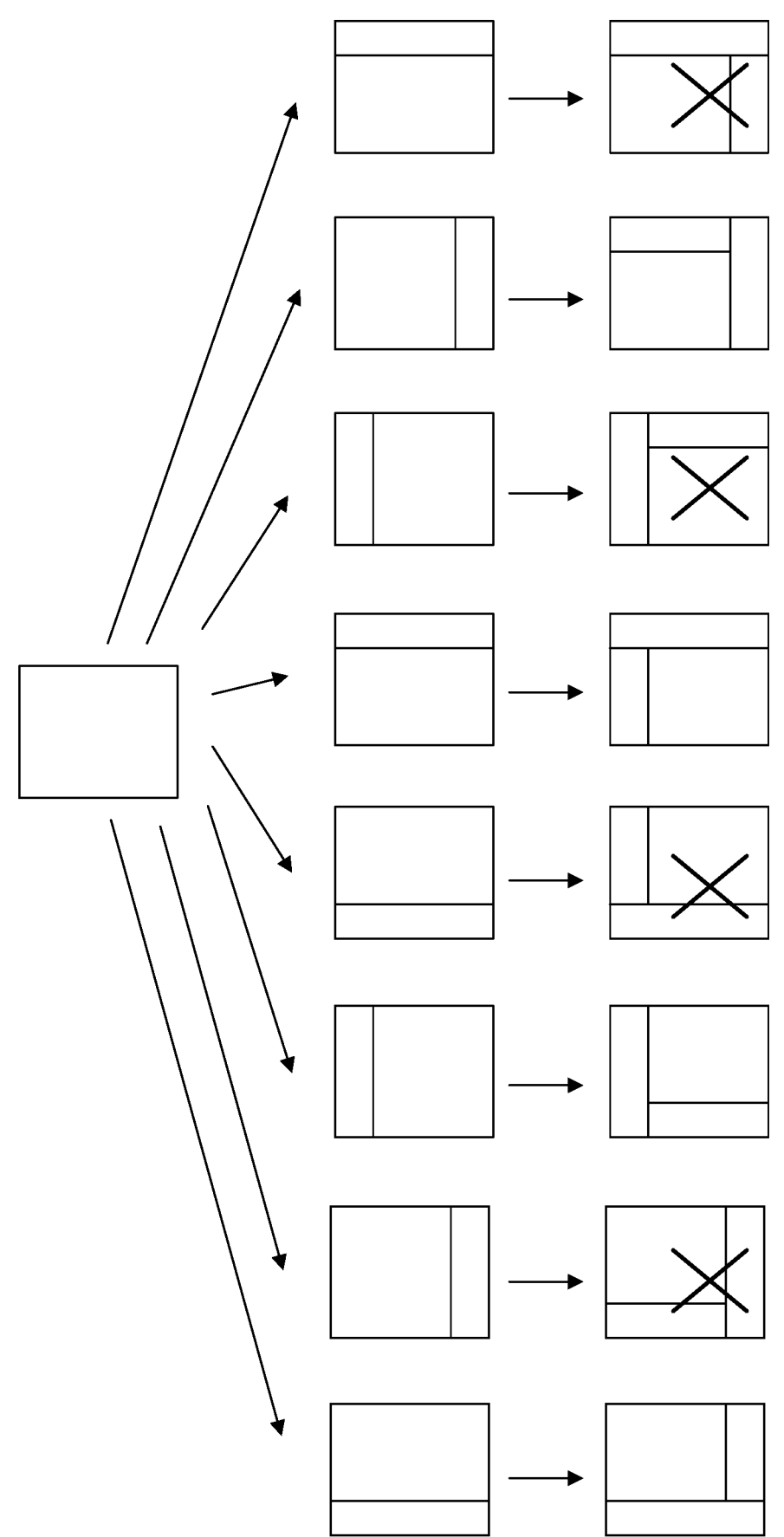
FIG. 14 illustrates allowed and disallowed series of asymmetric splits according to the present embodiment

In the present embodiment, some additional series of ABT split are normatively forbidden. The principle is to limit the number of allowed series of splits, in a way that refines the trade-offs between the amount of allowed split series and the compression efficiency. In particular, a reduced combinatory in terms of allowed split series leads to reduced encoder-side complexity, in the rate distortion search for the best block partitioning. The principle of the present normative split restrictions is that when successively using horizontal (resp. vertical) then vertical (resp. horizontal) asymmetric split, the considered succession of 2 splits leads to isolating the sub-area of the input block that is % the size of the parent block in width and height. This is illustrated in FIG. 14. As can be seen, two ways of isolation are possible, by splitting the parent block horizontally first, or by splitting the parent block vertically first. The proposed embodiment consists in normatively forbidding one of these two ways, assuming they play a similar role in terms of sub-area isolation in a given block.

The exemplary forbidden series of split according to the present embodiment are crossed out in FIG. 14.

Figure 15:
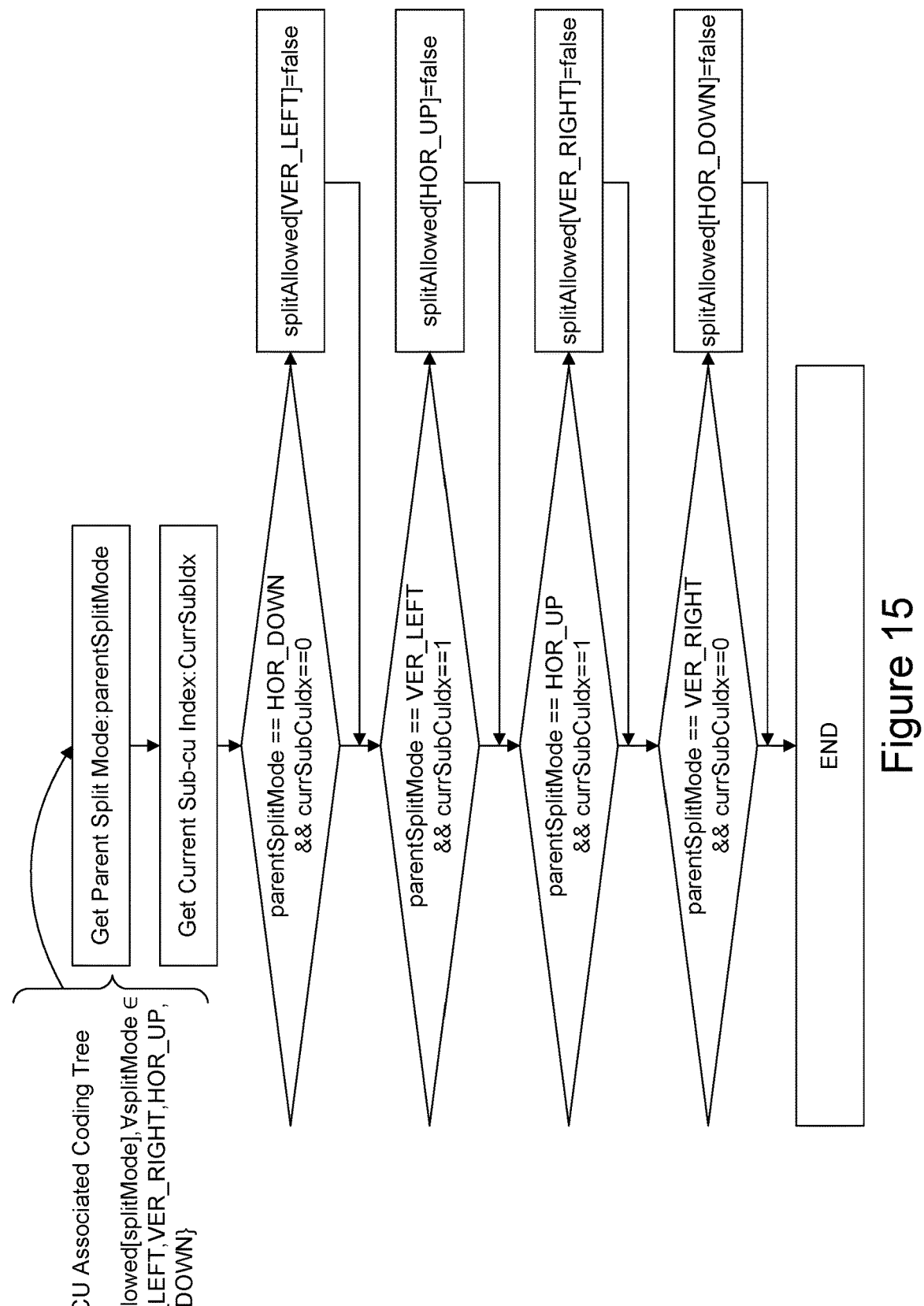
FIG. 15 illustrates derivation of allowed disallowed split modes according to the present embodiment.

The derivation process used to disallow some ABT split modes according to the present embodiment is shown by FIG. 15. The input to the process is the current CU and the associated coding tree leading to this CU. The first two steps consist in obtaining the split mode of the parent CU of current CU and the index of the current CU, in the splitting of the parent CU. Typically, this index currSubIdx is equal to 0 if the current CU is the first sub-CU of the parent CU in scanning order, and is equal to 1 if current CU is the second sub-CU of the parent CU in scanning order. Next steps tests if the parent split mode, noted parentSplitMode, is equal to HOR_DOWN and if currSubIdx is equal to 0, then the split mode VER_LEFT is normatively forbidden for current CU. This corresponds to the first disallowed split mode on the left of FIG. 14.

Similarly, next step tests if parentSplitMode is equal to VER_LEFT and currSubIdx is equal to 1. If so, then split mode HOR_UP is normatively forbidden for current CU, corresponding to second disallowed split in FIG. 14.

Similarly, next step tests if parentSplitMode is equal to HOR_UP and currSubIdx is equal to 1. If so, then split mode VER_RIGHT is normatively forbidden for current CU, corresponding to third disallowed split in FIG. 14.

Similarly, next step tests if parentSplitMode is equal to VER_RIGHT and currSubIdx is equal to 0. If so, then split mode HOR_DOWN is normatively forbidden for current CU, corresponding to third disallowed split in FIG. 14.

Variant: Encoder-Side-Only, Non-Normative Process

In the present embodiment as previously described, the described rules to disallow some ABT split modes are normative, i.e. are respected both on the encoder and decoder exactly the same way.

In a variant, the above-described rules for disabling some series of ABT splits may be applied on the encoder side only, to limit the amount of considered series of splits during the rate distortion optimization process. The advantage of this variant is that encoder-side complexity is reduced, and no additional logic needs to be supported on the decoder side. The drawback is a lower coding efficiency compared to the first variant since some redundant split information is signaled in the bit-stream.

Normative Restrictions/Configurations on Transform Size Usage

The use of ABT partitioning induces the use of multiple additional transform sizes, in the QTBT+TT partitioning framework of VVC. Typically, the added transform sizes are of the form $3 \times 2^n$, n=1, . . . , 5. If all these transform sizes are supported, then it means transform sizes 6, 12, 24, 48, 96 are allowed. In the case the CTU size is extended to 256, which is realistic for the future generation video compression standard beyond VVC, transform size 192 may also be supported.

The drawback of introducing all these transforms sizes in the codec, beyond increased memory consumption, is an increase combinatory in the encoder rate distortion search for the best partitioning of a CTU. Thus, the increased compression may come with a significant cost in terms of encoder-side complexity.

Therefore, the goal of the present embodiment is to refine the trade-offs between compression efficiency increase brought by ABT and the encoder-side complexity.

To do so, according to a first variant, transform size 96 is not supported. This means for a rectangular block of size 128 in vertical or horizontal direction, no ABT split is allowed in that direction. On the contrary, if the block size is lower than 128 in the other direction, then ABT split may be allowed in that other direction.

According to a further variant, transform size, hence CU size 48 is normatively forbidden. This means for a rectangular block of size 64 in vertical or horizontal direction, no ABT split is allowed in that direction. On the contrary, if the block size is different from 64 in the other direction, then ABT split may be allowed in that other direction.

According to a further variant, transform size, hence CU size 24 is normatively forbidden. This means for a rectangular block of size 32 in vertical or horizontal direction, no ABT split is allowed in that direction. On the contrary, if the block size is different from 32 in the other direction, then ABT split may be allowed in that other direction.

According to a further variant, transform size, hence CU size 12 is normatively forbidden. This means for a rectangular block of size 16 in vertical or horizontal direction, no ABT split is allowed in that direction. On the contrary, if the block size is different from 16 in the other direction, then ABT split may be allowed in that other direction.

Figure 16:
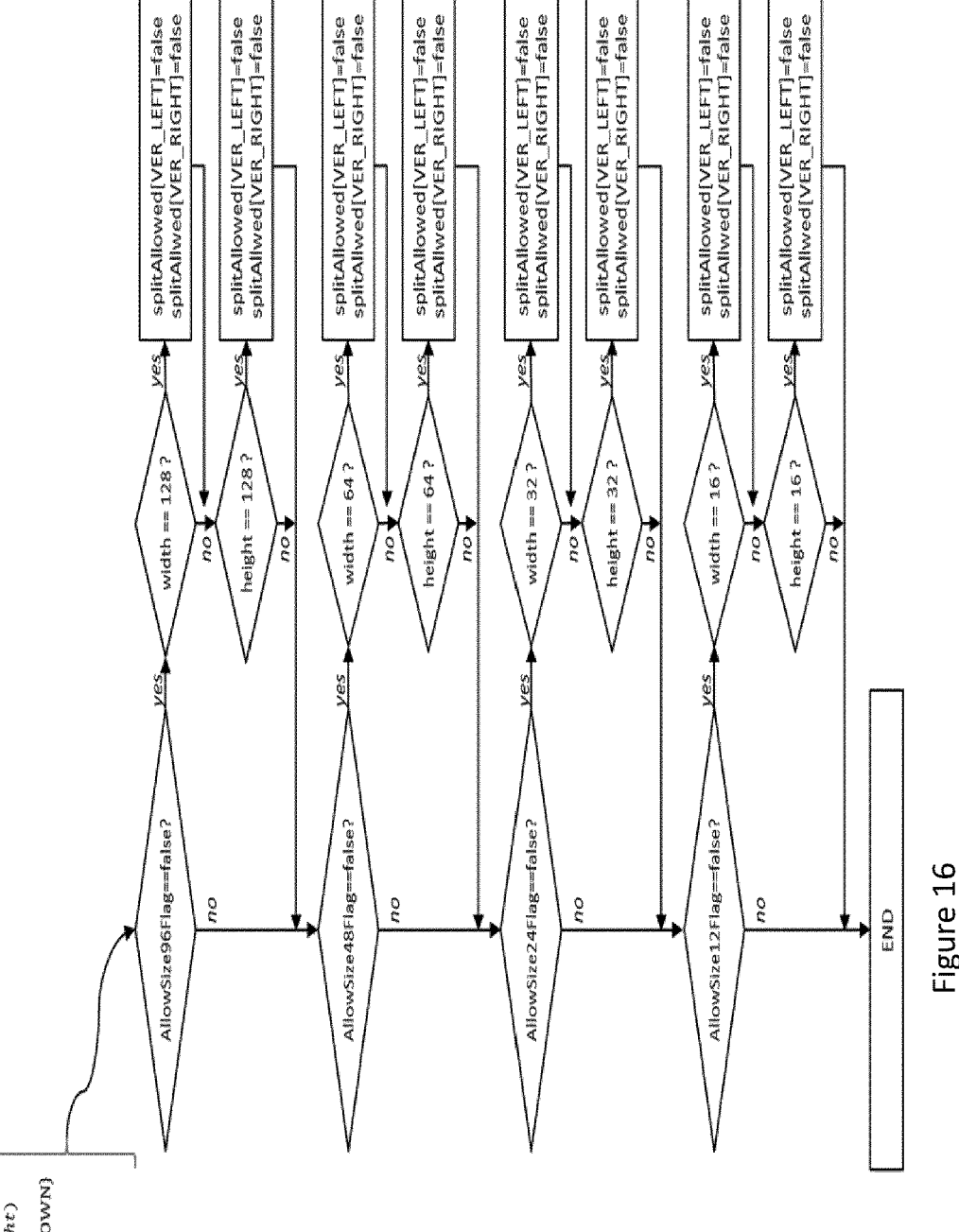
FIG. 16 illustrates proposed process to disallow some ABT split based on allowed and disallowed transform sizes in the considered slice/picture.

The process to disallow the split mode according to this embodiment it depicted by FIG. 16.

According to a further embodiment, the activation/deactivation of some ABT transform block size may be normatively configured in some high-level syntax elements.

For instance, the activation/deactivation of block size 12, 24, 48, 96 may be signaled in the SPS (Sequence Parameter Set). This may typically take the form of a flag associated to each block size 12, 24, 48 and 96.

According to a further variant, the activation/deactivation of ABT block sizes by be normatively configured for each temporal layer contained in the coded bit-stream. This may take the form of a series of flags indicating the use of each transform size, for each temporal layer. Then, during the coding or decoding of a slice or picture, the encoder or decoder knows which transform sizes are allowed in the considered slice or picture, based on the temporal layer the slice or picture belongs to.

According to a further variant, the activation/deactivation of ABT block sizes by be normatively configured for each slice type (Intra slice, B slice) contained in the coded bit-stream. This may take the form of a series of flags indicating the use of each transform size, for each slice type.

Variant: Encoder-Side-Only, Non-Normative Process

In the present embodiment as previously described, the described rules to disallow some ABT split modes according to the supported transform sizes, optionally based on the temporal layer of the slice being coded/decoded, or based on the slice type, are normative, i.e. are respected both on the encoder and decoder exactly the same way.

In a variant, the above-described rules for configure the transform sizes supported and the associated disabling of some ABT split modes according to the current block width or height, the temporal layer or the slice type, may be applied on the encoder side only, to limit the amount of considered series of splits during the rate distortion optimization process. The advantage of this variant is that encoder-side complexity is reduced, and no additional logic needs to be supported on the decoder side. The drawback is a lower coding efficiency compared to the first variant since some redundant split information is signaled in the bit-stream.

Further Embodiment: Maximum ABT Size Coding Parameter

According to a further embodiment, a syntax element dedicated to ABT partitioning, similar to the VVC syntax elements sps_log_2_diff_max_bt_min_qt_intra_slice_luma and sps_log_2_diff_max_tt_min_qt_intra_slice_luma, is introduced to normatively configure the usage of ABT partitioning in the luma component of an intra slice, when dual tree is used in the considered bitstream. This takes the form of the syntax element sps_log_2_diff_max_abt_min_qt_intra_slice_luma, which is signaled after the syntax element sps_log_2_diff_max_tt_min_qt_intra_slice_luma.

Where MinQtLog2SizeY is the log 2 of the minimum CU size than can be obtained from quad-tree splitting. Similarly, syntax elements sps_log_2_diff_max_abt_min_qt_intra_slice_chroma and sps_log_2_diff_max_abt_min_qt_inter_slice.

The modified SPS syntax structure is shown in Table 1.

TABLE 1 modified sequence parameter set according to the present embodiment.

| | Descriptor |
|---|---|
| seq_parameter_set_rbsp( ) { | |
| ..... | |
|   sps_log2_min_luma_coding_block_size_minus2 | ue(v) |
|   sps_partition_constraints_override_enabled_flag | u(1) |
|   sps_log2_diff_min_qt_min_cb_intra_slice_luma | ue(v) |
|   sps_max_mtt_hierarchy_depth_intra_slice_luma | ue(v) |
|   if( sps_max_mtt_hierarchy_depth_intra_slice_ | |
|   luma != 0 ) { | |
|     sps_log2_diff_max_bt_min_qt_intra_slice_luma | ue(v) |
|     sps_log2_diff_max_tt_min_qt_intra_slice_luma | ue(v) |
|     sps_log2_diff_max_abt_min_qt_intra_slice_luma | ue(v) |
|   } | |
|   if( sps_chroma_format_idc != 0 ) | |
|     sps_qtbtt_dual_tree_intra_flag | u(1) |
|   if( sps_qtbtt_dual_tree_intra_flag ) { | |
|     sps_log2_diff_min_qt_min_cb_intra_slice_chroma | ue(v) |
|     sps_max_mtt_hierarchy_depth_intra_slice_chroma | ue(v) |
|     if( sps_max_mtt_hierarchy_depth_intra_slice_ | |
|     chroma != 0 ) { | |
|       sps_log2_diff_max_bt_min_qt_intra_slice_chroma | ue(v) |
|       sps_log2_diff_max_tt_min_qt_intra_slice_chroma | ue(v) |
|       sps_log2_diff_max_abt_min_qt_intra_slice_chroma | ue(v) |
|     } | |
|   } | |
|   sps_log2_diff_min_qt_min_cb_inter_slice | ue(v) |
|   sps_max_mtt_hierarchy_depth_inter_slice | ue(v) |
|   if( sps_max_mtt_hierarchy_depth_inter_slice != 0 ) { | |
|     sps_log2_diff_max_bt_min_qt_inter_slice | ue(v) |
|     sps_log2_diff_max_tt_min_qt_inter_slice | ue(v) |
|     sps_log2_diff_max_abt_min_qt_inter_slice | ue(v) |
|   } | |
| ..... | |
| } | |

In addition, similarly to the maximum binary tree (BT) size and maximum ternary tree (TT) size signaling in the picture header that is specified in VVC, the following syntax elements may be added to the picture header syntax.

ph_log_2_diff_max_tt_min_intra_slice_luma
    ph_log_2_diff_max_abt_min_qt_intra_slice_chroma
    ph_log_2_diff_max_tt_min_qt_inter_slice In the same way as for BT and TT max sizes related syntax elements, these 3 syntax elements are inferred to be equal to their respective SPS-level counterparts, if not present in the bit-stream.

The so-modified picture header syntax structure is depicted in Table 2.

TABLE 2 modified picture header syntax structure according to the present embodiment.

| | Descriptor |
|---|---|
| picture_header_structure( ) { | |
| .... | |
|   if( sps_partition_constraints_override_enabled_flag ) | |
|     ph_partition_constraints_override_flag | u(1) |
|   if( ph_intra_slice_allowed_flag ) { | |
|     if( ph_partition_constraints_override_flag ) { | |
|       ph_log2_diff_min_qt_min_cb_intra_slice_luma | ue(v) |
|       ph_max_mtt_hierarchy_depth_intra_slice_luma | ue(v) |
|       if( ph_max_mtt_hierarchy_depth_intra_slice_ | |
|       luma != 0 ) { | |
|         ph_log2_diff_max_bt_min_qt_intra_slice_luma | ue(v) |
|         ph_log2_diff_max_tt_min_qt_intra_slice_luma | ue(v) |
|         ph_log2_diff_max_tt_min_qt_intra_slice_luma | ue(v) |
|       } | |

TABLE 2-continued modified picture header syntax structure according to the present embodiment.

| | Descriptor |
|---|---|
|     if( sps_qtbtt_dual_tree_intra_flag ) { | |
|       ph_log2_diff_min_qt_min_cb_intra_slice_chroma | ue(v) |
|       ph_max_mtt_hierarchy_depth_intra_slice_chroma | ue(v) |
|       if( ph_max_mtt_hierarchy_depth_intra_slice_ | |
|       chroma != 0 ) { | |
|         ph_log2_diff_max_bt_min_qt_intra_slice_chroma | ue(v) |
|         ph_log2_diff_max_tt_min_qt_intra_slice_chroma | ue(v) |
|         ph_log2_diff_max_abt_min_qt_intra_slice_ | ue(v) |
|         chroma | |
|       } | |
|     } | |
|   } | |
|   if( pps_cu_qp_delta_enabled_flag ) | |
|     ph_cu_qp_delta_subdiv_intra_slice | ue(v) |
|   if( pps_cu_chroma_qp_offset_list_enabled_flag ) | |
|     ph_cu_chroma_qp_offset_subdiv_intra_slice | ue(v) |
|   } | |
|   if( ph_inter_slice_allowed_flag ) { | |
|     if( ph_partition_constraints_override_flag ) { | |
|       ph_log2_diff_min_qt_min_cb_inter_slice | ue(v) |
|       ph_max_mtt_hierarchy_depth_inter_slice | ue(v) |
|       if( ph_max_mtt_hierarchy_depth_inter_slice != 0 ) { | |
|         ph_log2_diff_max_bt_min_qt_inter_slice | ue(v) |
|         ph_log2_diff_max_tt_min_qt_inter_slice | ue(v) |
|         ph_log2_diff_max_tt_min_qt_inter_slice | ue(v) |
|       } | |
|     } | |
| ..... | |
| } | |

As a consequence, the maximum ABT sizes in the luma component of an intra picture coded with dual tree, in the chroma component of an intra picture coded with dual tree $$\text{MaxAbtSizeY}=1<<(\text{MinQtLog2SizeY}+ \\ \text{ph\_log\_2\_diff\_max\_abt\_min\_qt\_intra\_slice\_luma})$$

$$\text{MaxAbtSizeC}=1<<(\text{MinQtLog2SizeC}+ \\ \text{ph\_log\_2\_diff\_max\_abt\_min\_qt\_intra\_slice\_chroma})$$

In an inter picture, the maximum ABT size is derived as follows.

$$\text{MaxAbtSizeY}=1<<(\text{MinQtLog2SizeY}+ \\ \text{ph\_log\_2\_diff\_maxabt\_mintinter\_slice})\text{MaxAbt-} \\ \text{SizeC}=1<<(\text{MinQtLog2SizeC}+ \\ \text{ph\_log\_2\_diff\_max\_abt\_min\_t\_inter\_slice})$$

In terms of semantics, similarly to the case of BT or TT, the maximum Abt Size is defined as the maximum CU size, in width or height, where ABT splitting is allowed. It means that ABT splitting is disallowed in a CU if the CU width or the CU height is higher than the maximum ABT size.

Further Embodiment: Modified Specification of the Maximum ABT Size

According to a further variant, the semantics of the maximum ABT size parameters are defined as follows.

Let MaxAbtSize be defined as MaxAbtSizeC if current CU belongs to the chroma component of a slice coded in dual tree, and equal to MaxAbtSizeY otherwise.

If a current CU's width is higher than MaxAbtSize, then any vertical ABT split is disallowed. If current CU's height is higher than MaxAbtSize, then any horizontal ABT split is disallowed.

Figure 17:
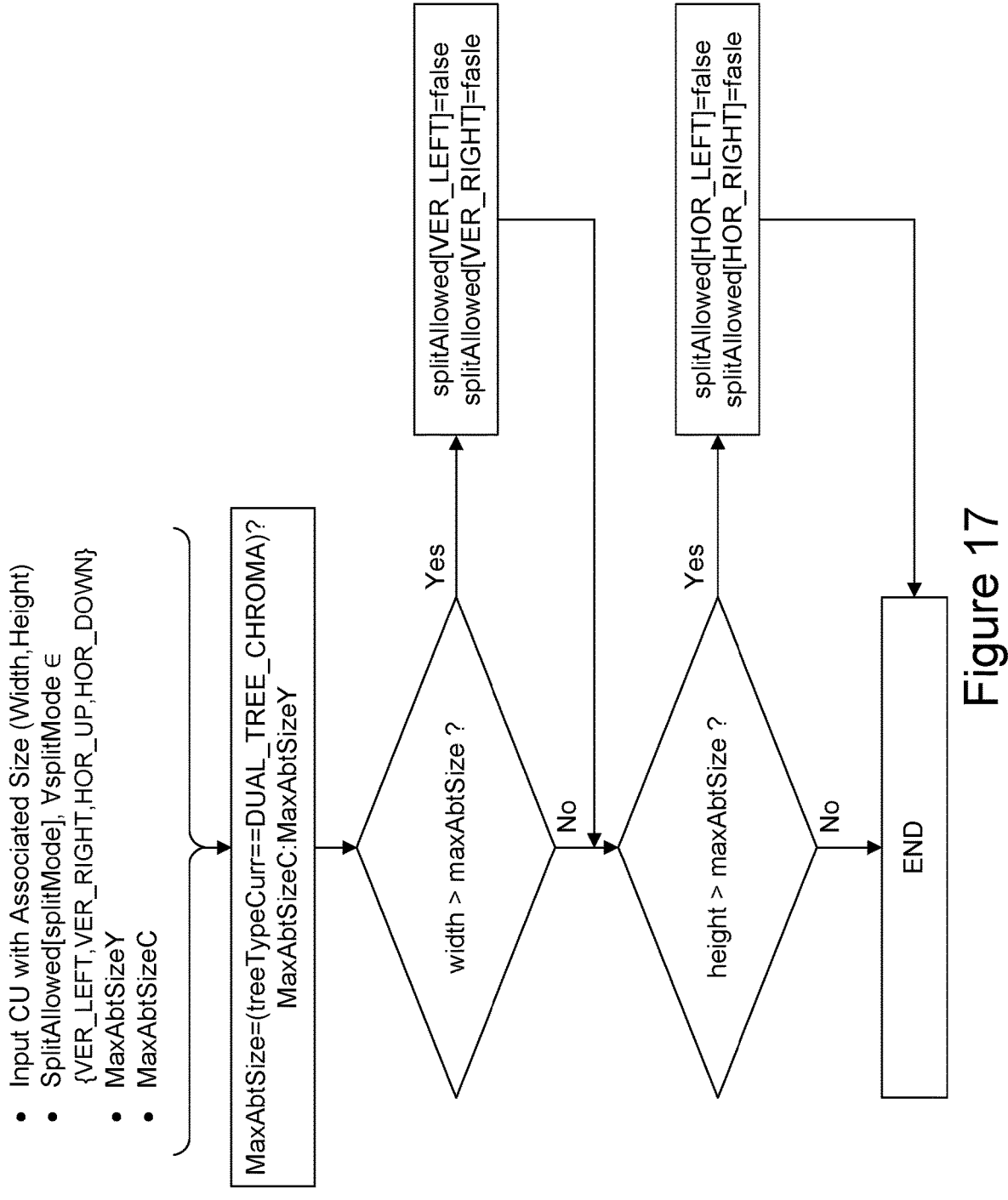
FIG. 17 illustrates derivation of disallowed split mode based on maxAbtSize, according to the present embodiment.

The so-proposed process to normatively disallow the vertical or horizontal ABT split as a function of the max-AbtSize parameter is depicted in FIG. 17.

Normative Rule for LMCS Parameter Derivation

The VVC video coding standard is designed such that the decoding of a picture can proceed on a 64×64 luma sample block basis, that is to say all the samples contained in a 64×64 luma area and the samples contained in the corresponding 32×32 chroma area can be fully reconstructed before started to decode the next 64×64/32×32 luma/chroma area in the picture. Such 64×64/32×32 luma/chroma area is called a Virtual Pipeline Decoding Unit (VPDU). As a consequence, the rules that have been taken into account to design the VVC architecture are the two following ones:

If a CU contains at least one VPDU, then it must contain one or several entire VPDU If a VPDU contains at least one CU, then it must contain one or several entire CU.

In other words, a CU is entirely contained in a VPDU or contains entire VPDU(s). In the same way, a VPDU is either entirely contained in a CU or contains one or more entire CUs.

Figure 18:
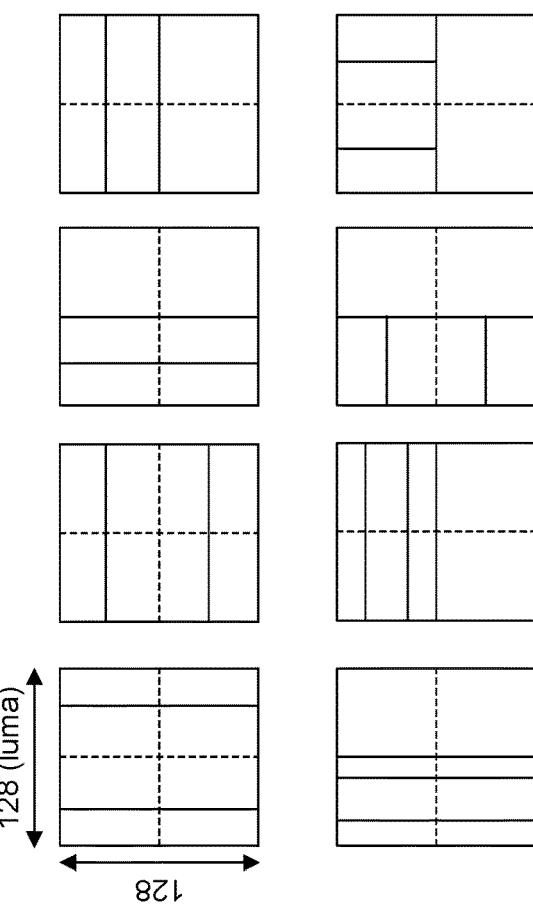
FIG. 18 illustrates allowed splits (left) and disallowed spits (right) according to VVC specification, to respect the VPDU constraint.
Figure 18:
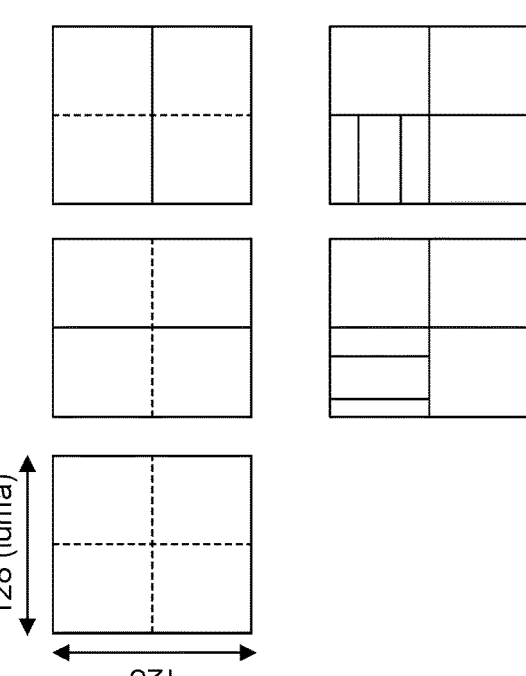
Figure 19:
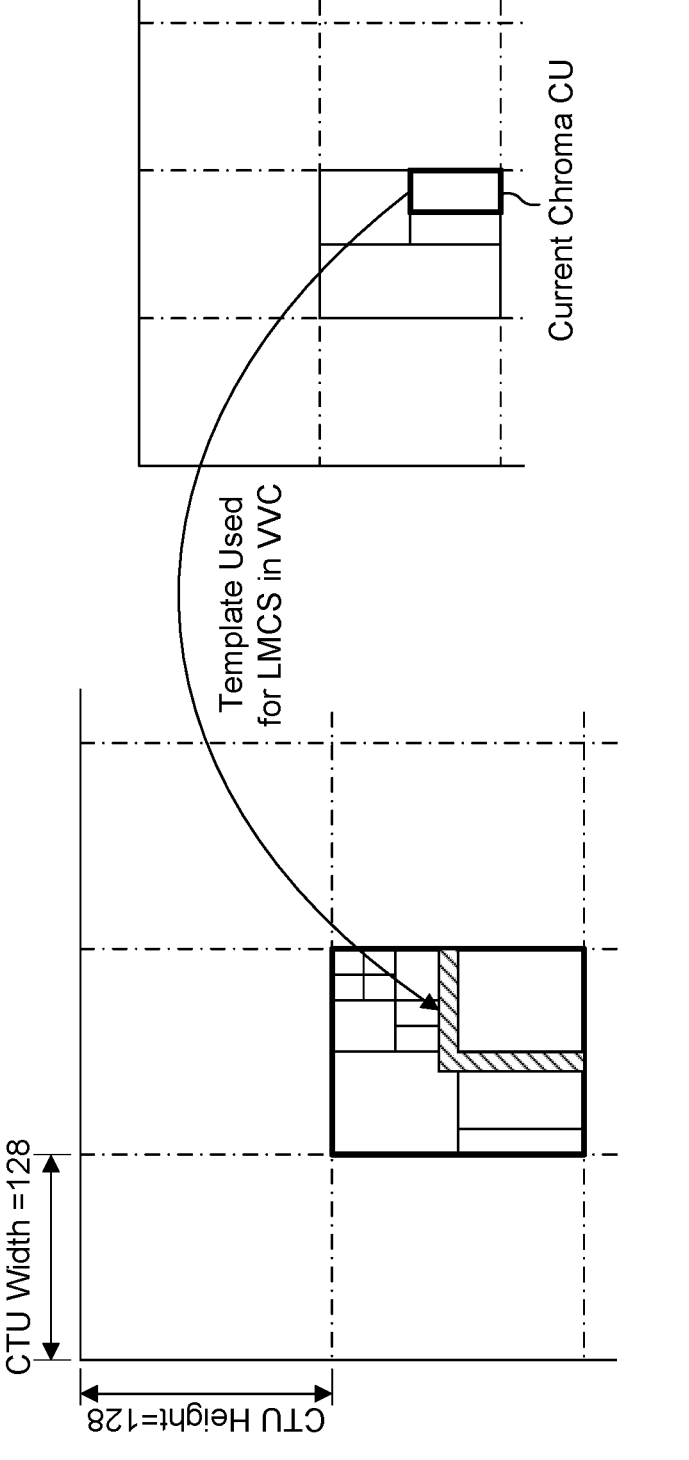
FIG. 19 illustrates luma component template used in VVC for LMCS chroma scaling factor computation, in the case of an intra slice coded in dual tree mode.
Figure 20:
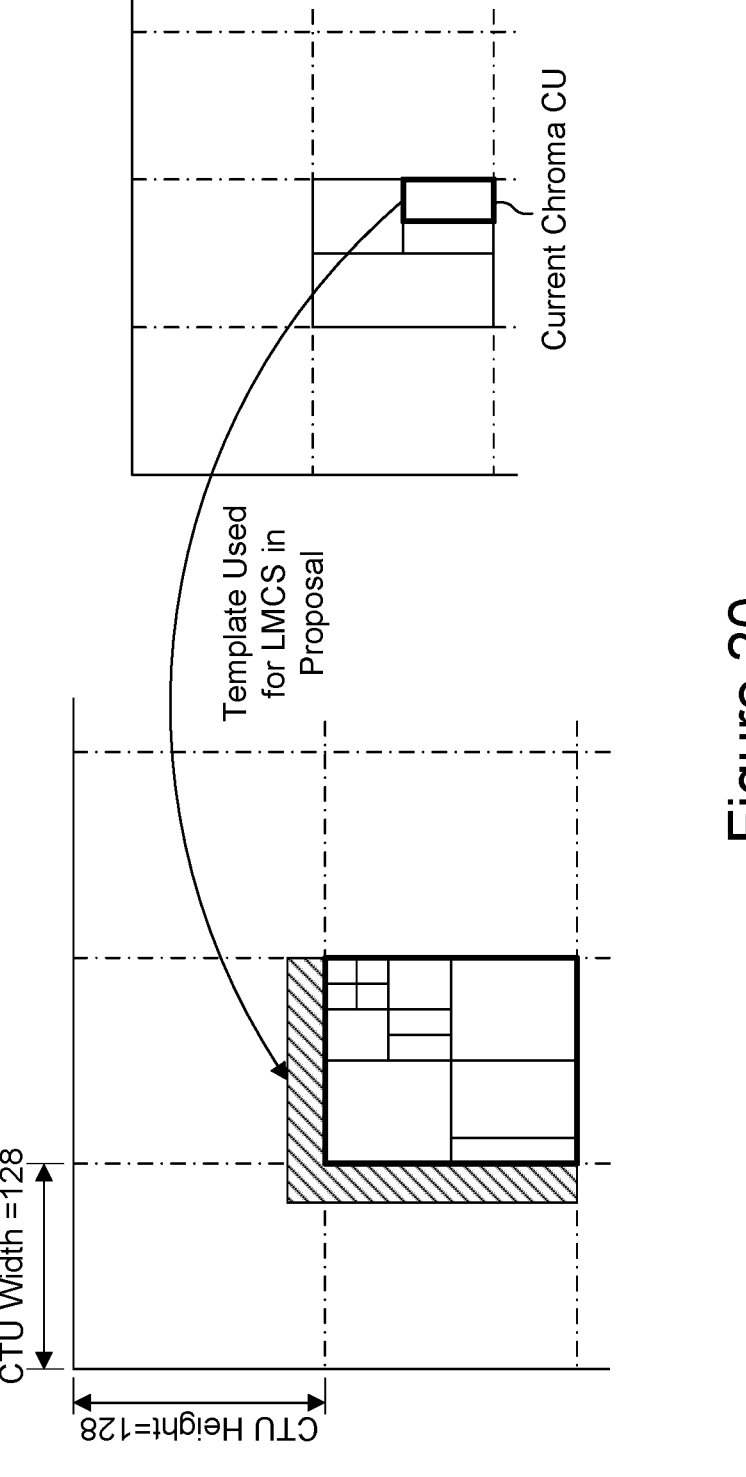
FIG. 20 illustrates modified template in proposed embodiment to compute LMCS chroma scaling factor in the case of intra slice coded in dual tree mode.
Figure 21:
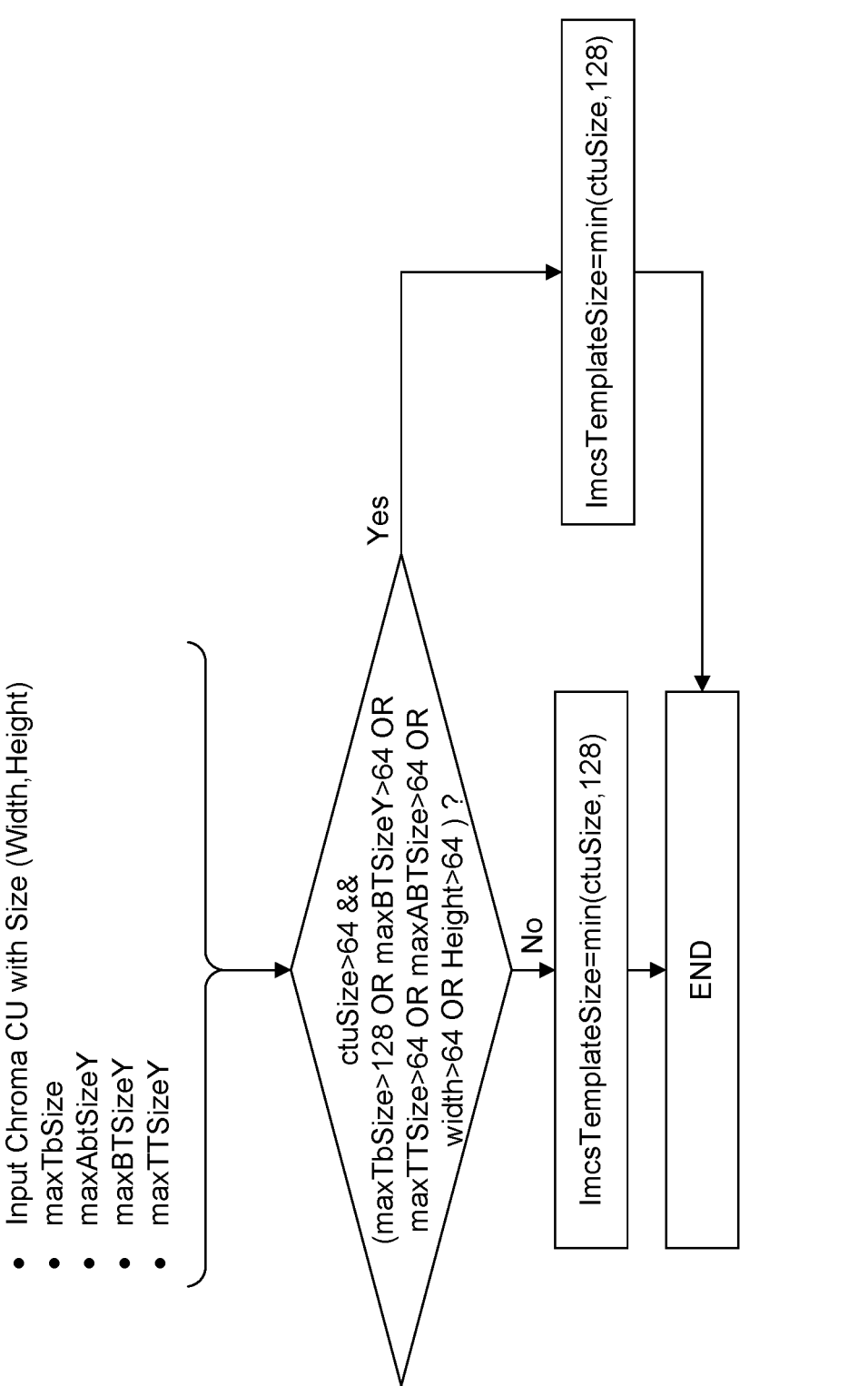
FIG. 21 illustrates proposed process to determine the size of the luma template used to compute the LMCS chroma scaling parameter, in the case of dual tree mode.
Figure 22:
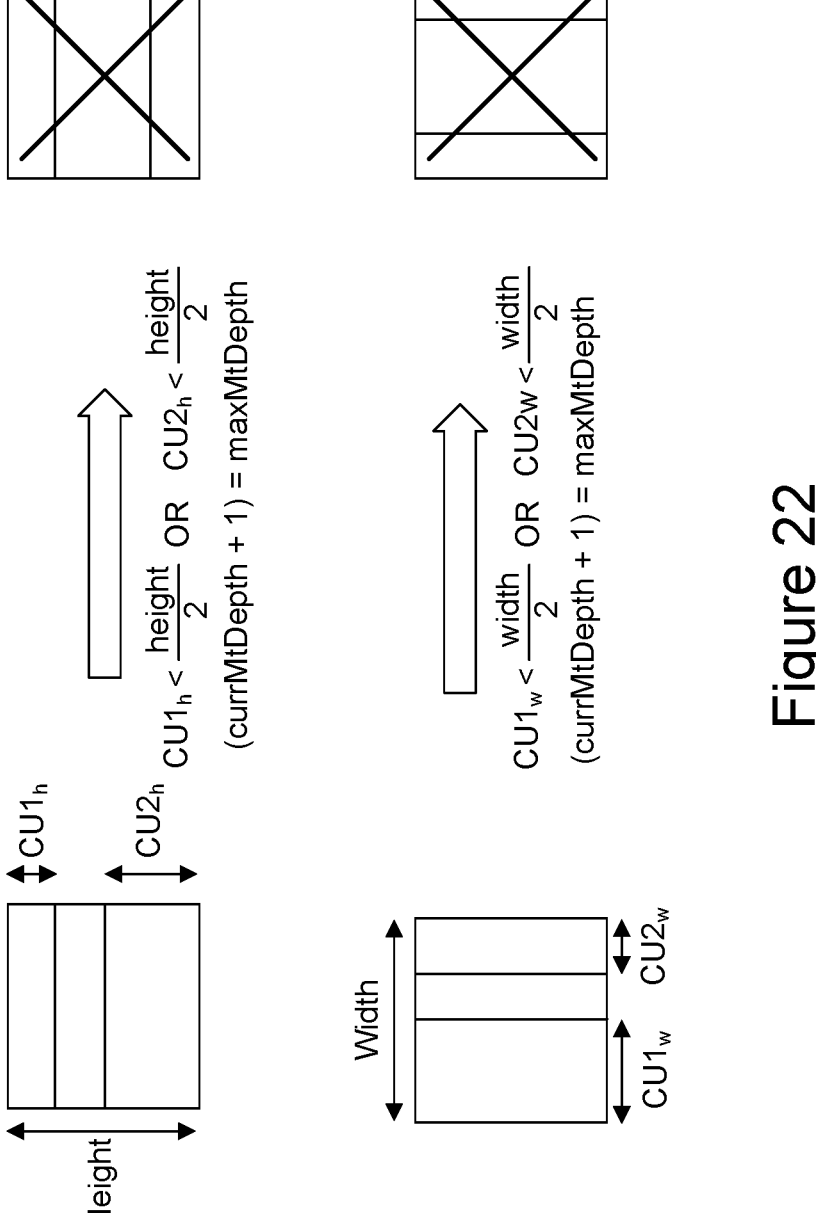
FIG. 22 illustrates encoder side speed-up present in VVC reference software for speeding up the rate distortion search dedicated to TT split.

These rules led to some constraints on the allowed and disallowed split modes, as illustrated in FIG. 18. Basically, BT splits are normatively forbidden in blocks of size 128×64 and 64×128. Moreover, TT splits are normatively forbidden in blocks of size 128×128, 128×64 and 64×128.

In an embodiment of this disclosure, the maxABTSize parameter is set to a value larger than 64×64 for compression efficiency reasons. Similarly, the maxBTSize and maxTT-Size parameters are set to values larger than 64×64, which breaks the 64×64/32×32 VPDU concept of VVC.

Indeed, in VVC, some coding tools like LMCS (Luma Mapping with Chroma Scaling) proceed on a VPDU basis, i.e. on a 64×64 luma area basis. LMCS consists in reshaping the luma samples of a block, i.e. it applies a monotonic growing function on each of them through a so-called luma look-up table. It also rescales the chroma components samples, through a multiplicative factor derived from the reconstructed luma samples in a template area around the current CU. In VVC, in the case of a slice coded with separated luma and chroma coding trees (called the dual tree mode), this template is set as the set of top and left reconstructed luma samples around the VPDU (i.e. 64×64 luma area) the current CU belongs to.

However, as the maximum BT size, the maximum TT size and possibly the maximum ABT size can be set to a value larger than 64, this VPDU based luma template to compute the chroma scaling factor may no more be valid.

As a consequence, an adaptation of the LMCS chroma scaling factor derivation is needed. To so, the template region over which the average reconstructed luma is computed may consist in the top and left sample around the 128×128 luma region the current CU belongs to.

However, in case the maximum transform size is lower than 128, typically 64, and the maximum TT and ABT sizes are at most 64, then the luma block area over which the chroma scaling factor is computed could be kept equal to 64×64.

Furthermore, to achieve a good trade-off between compression efficiency and complexity, it may be of interest of using a maximum BT, TT and ABT size lower or equal to 64, especially for low resolution video content. In that case, the area size considered to compute LMCS chroma scaling parameter may be set to 64×64 rather than 128×128.

As a consequence, the process proposed in this embodiment consists in dynamically altering the VPDU size considered in LMCS as a function of the maximum transform block size, the maximum ABT size and the maximum TT size parameters.

Normative Rules Related to Max Transform Size Extended to 128

In this section, some normative embodiments to optimize the trade-off between coding efficiency and encoder side complexity are proposed.

The principle of the embodiments proposed in this section is that for high resolution sequences, it is helpful to allow for larger transform block sizes than 64, which is the maximum transform size supported by VVC standard. However, for low resolution content, the support for large block sizes may lead to useless additional encoder complexity. For low resolution sequences, it has been observed that a better trade-off between coding efficiency and encoder side complexity can be obtained by keeping a limited maximum block size.

In particular, in VVC, because of the VPDU concept already presented before, in intra slices where separated luma/chroma coding trees are used, in VVC, if a 128×128 CTU is split, then the quad-tree split is systematically applied both in luma and chroma components. This means the luma and chroma coding tree are only separated from coding tree nodes corresponding to quad-tree nodes with quad-tree depth level corresponding to 64×64/32×32 luma/chroma block areas. It has been observed that removing this normative rule provides the encoder with more freedom in the splitting of the CTU, but this increased freedom leads to higher encoder complexity, with very limited increase in coding efficiency for low resolution video content.

As a consequence, it is proposed in an embodiment to switch from joint luma/chroma coding tree to dual coding tree at a quad-tree node size that can be configured, through a quad-tree node size parameter for instance.

In a particular embodiment, the maximum transform block size is used to determine the quad-tree node size at which the coding tree is switching from a joint luma/chroma tree to separated luma/chroma coding trees. This embodiment thus involves the modified dual_tree_implicit_qt_split syntax structure compared to the VVC standard specification, as depicted by Table 3.

TABLE 3 modified dual_tree_implicit_qt_split according to the present embodiment.

|  | Descriptor |
|---|---|

```
dual_tree_implicit_qt_split( x0, y0, cbSize, cqtDepth ) {
    cbSubdiv = 2 * cqtDepth
    if( cbSize > maxTbSize ) {
        if( pps_cu_qp_delta_enabled_flag && cbSubdiv <= CuQpDeltaSubdiv ) {
            IsCuQpDeltaCoded = 0
            CuQpDelta Val = 0
            CuQgTopLeftX = x0
            CuQgTopLeftY = y0
        }
```

TABLE 3-continued modified dual_tree_implicit_qt_split according to the present embodiment.

|  | Descriptor |
|---|---|

```
    if(          sh_cu_chroma_qp_offset_enabled_flag                    &&
          cbSubdiv <= CuChromaQpOffsetSubdiv ) {
      IsCuChromaQpOffsetCoded = 0
      CuQpOffset_Cb = 0
      CuQpOffset_Cr = 0
      CuQpOffset_CbCr = 0
    }
    x1 = x0 + ( cbSize / 2 )
    y1 = y0 + ( cbSize / 2 )
      dual_tree_implicit_qt_split( x0, y0, cbSize / 2, cqtDepth + 1 )
    if( x1 < pps_pic_width_in_luma_samples )
      dual_tree_implicit_qt_split( x1, y0, cbSize / 2, cqtDepth + 1 )
    if( y1 < pps_pic_height_in_luma_samples )
      dual_tree_implicit_qt_split( x0, y1, cbSize / 2, cqtDepth + 1 )
    if( x1 < pps_pic_width_in_luma_samples && y1 <pps_pic_height_in_luma_samples
)
      dual_tree_implicit_qt_split( x1, y1, cbSize / 2, cqtDepth + 1 )
  } else {
    coding_tree( x0, y0, cbSize, cbSize, 1, 0, cbSubdiv, cqtDepth, 0, 0, 0,
          DUAL_TREE_LUMA, MODE_TYPE_ALL )
    coding_tree( x0, y0, cbSize, cbSize, 0, 1, cbSubdiv, cqtDepth, 0, 0, 0,
          DUAL_TREE_CHROMA, MODE_TYPE_ALL )
  }
}
```

Furthermore, the introduction of a maximum transform size larger than 64 may also lead to further normative modification in the VVC specification, which are listed in the following.

Regarding the SBT (sub-block transform) coding tool, which consists in splitting an inter coded CU into two be at most 64. The advantage of this is that low compression efficiency increase is to be expected by allowing the SBT tool to be used in CU strictly larger than 64 in width or height. The modification brought to the coding unit syntax structure according to this embodiment is shown shaded in Table 4.

TABLE 4 modification of the VVC coding_unit syntax structure as proposed in the present embodiment.

|  | Descriptor |
|---|---|

```
Coding_unit( x0, y0, cbWidth, cbHeight, cqtDepth, treeType, modeType ) {
  if( CuPredMode[ chType ][ x0 ][ y0 ] != MODE_INTRA && !pred_mode_plt_flag &&
      general_merge_flag[ x0 ][ y0 ] = = 0 )
    cu_coded_flag                                                        ae(v)
  if( cu_coded_flag ) {
    if( CuPredMode[ chType ][ x0 ][ 0 ] = = MODE_INTER && sps_sbt_enabled_flag &&
      !ciip_flag[ x0 ][ y0 ]        &&        cbWidth <= min(64,MaxTbSizeY)        &&
cbHeight <= min(64,MaxTbSizeY) ) {
      allowSbtVerH = cbWidth >= 8
      allowSbtVerQ = cb Width >= 16
      allowSbtHorH = cbHeight >= 8
      allowSbtHorQ = cbHeight >= 16
      if( allowSbtVerH || allowSbtHorH )
        cu_sbt_flag                                                      ae(v)
      if( cu_sbt_flag ) {
        if( ( allowSbtVerH || allowSbtHorH ) && ( allowSbtVerQ || allowSbtHorQ ) )
          cu_sbt_quad_flag                                               ae(v)
        if( ( cu_sbt_quad_flag && allowSbtVerQ && allowSbtHorQ ) ||
            ( !cu_sbt_quad_flag && allowSbtVerH && allowSbtHorH ) )
          cu_sbt_horizontal_flag                                         ae(v)
        cu_sbt_pos_flag                                                  ae(v)
      }
      ....
  }
```

Tus, the maximum CU size for which SBT is allowed is fixed to the maximum transform size in width and height. In this embodiment, it is proposed to fix the maximum SBT CU size to min(64, maxTbSize), i.e. whatever the maximum transform size value, it should According to a further normative modification to VVC spec, the SPS-level flag indicates the maximum transform size used in the coded bit-stream. In VVC specification, an SPS flag indicated if the maximum transform size is 64 or 32. Here, it is proposed to change this flag to a flag that indicates if the maximum transform size is equal to 128 or 64. The modifications brought to the SPS syntax table is shown in Table 5.

TABLE 5 proposed maximum transform size signaling in the present embodiment.

| | Descriptor |
|---|---|
| seq_parameter_set_rbsp( ) { | |
| .... | |
| if( CtbSizeY > 64 ) | |
| sps_max_luma transform size_128 flag | u(1) |
| sps_transform_skip_enabled_flag | u(1) |
| if( sps_transform_skip_enabled_flag ) { | |
| sps_log2_transform_skip_max_size_minus2 | ue(v) |
| sps_bdpcm_enabled_flag | u(1) |
| } | |
| .... | |
| } | |

Finally, a last modification to the VVC spec with regards to the allowing or disabling of matrix-based intra prediction (MIP) for intra coding units.

In VVC, MIP is allowed up to 64×64 block size whatever the maximum transform size. In this embodiment, it is proposed to allow MIP up to the maximum transform size. This means MIP may be allowed up to block size 128×128.

Normative Process Related to Non-Dyadic CUs Coded in SBT Mode

According to an embodiment, a coding unit issued from an asymmetric split that may have a size equal to 12 can be coded with the SBT (Sub-Block Transform) mode introduced above.

In such case, the TUs resulting from the SBT partitioning of the CU may have a size equal to 6 luma samples in width or height, or a size equal to 3 luma samples in width or height.

To properly support such TU sizes, the deblocking filtering process of VVC is adapted. Indeed, in VVC, the deblocking filtering process proceeds on a 4×4 block-basis. For each vertical and horizontal potential block boundary of 4 luma samples long, it is determined whether to apply a deblocking filtering process or not at the considered vertical or horizontal potential block edge.

To do so, it is tested whether the considered edge is at the boundary between two coded blocks (CU or TU), and if so, the strength of the deblock filter is determined according to various coding parameters. These coding parameters may be the respective QP (quantization parameter) of each of the two blocks, the coding mode (Intra, Inter) of the two neighboring blocks, and possibly the motion vectors of the two neighboring blocks.

Figure 28:
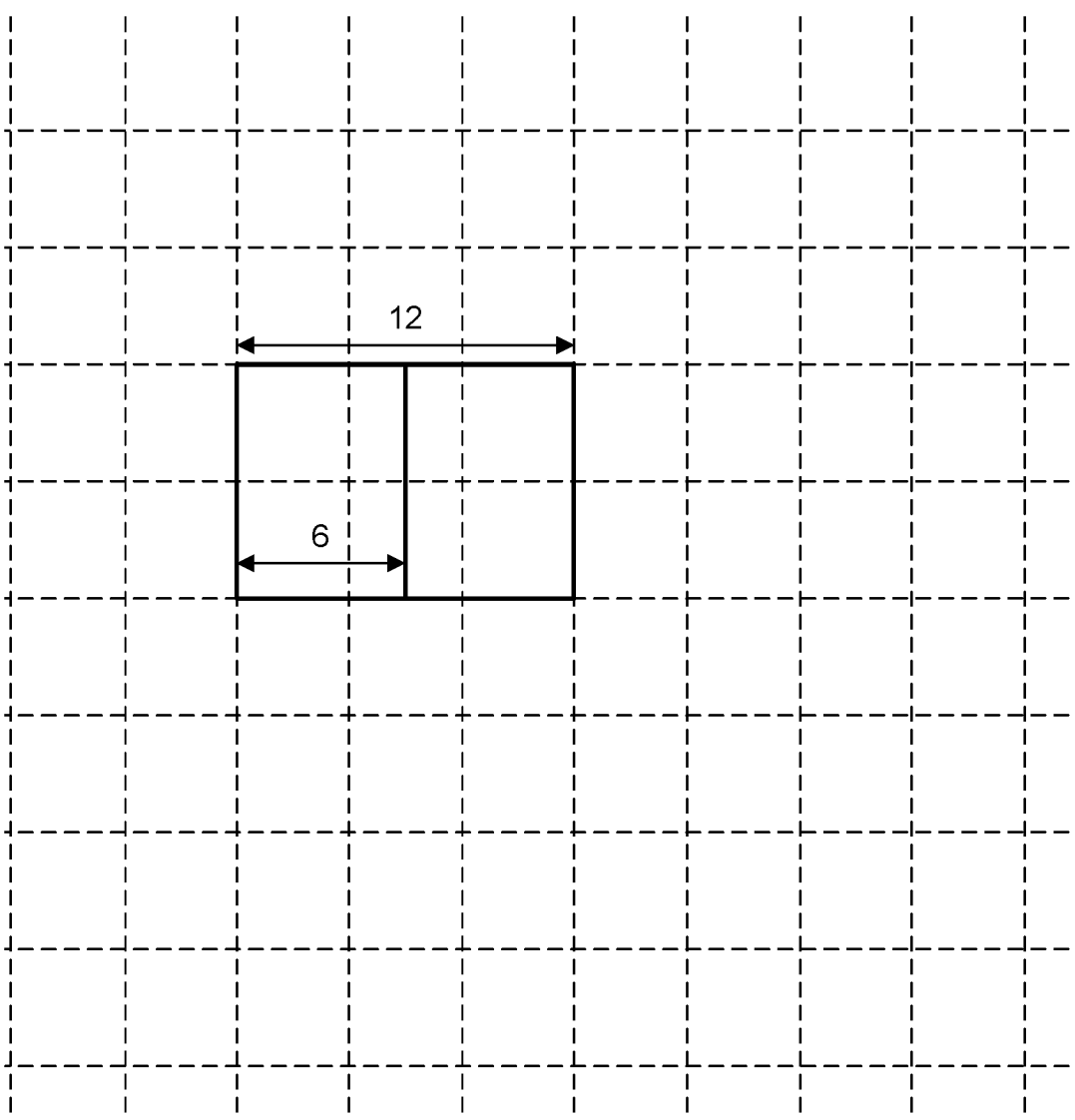
FIG. 28 illustrates a 4-luma sample vertical or horizontal edge may overlap 2 different Transform Units.

With respect to transform units of size 6 in a luma component, the VVC deblocking process achieved on a 4-luma-samples-edge basis is no longer adapted, because a 4-luma sample vertical or horizontal edge may overlap 2 different TUs. This is illustrated in FIG. 28.

Figure 29:
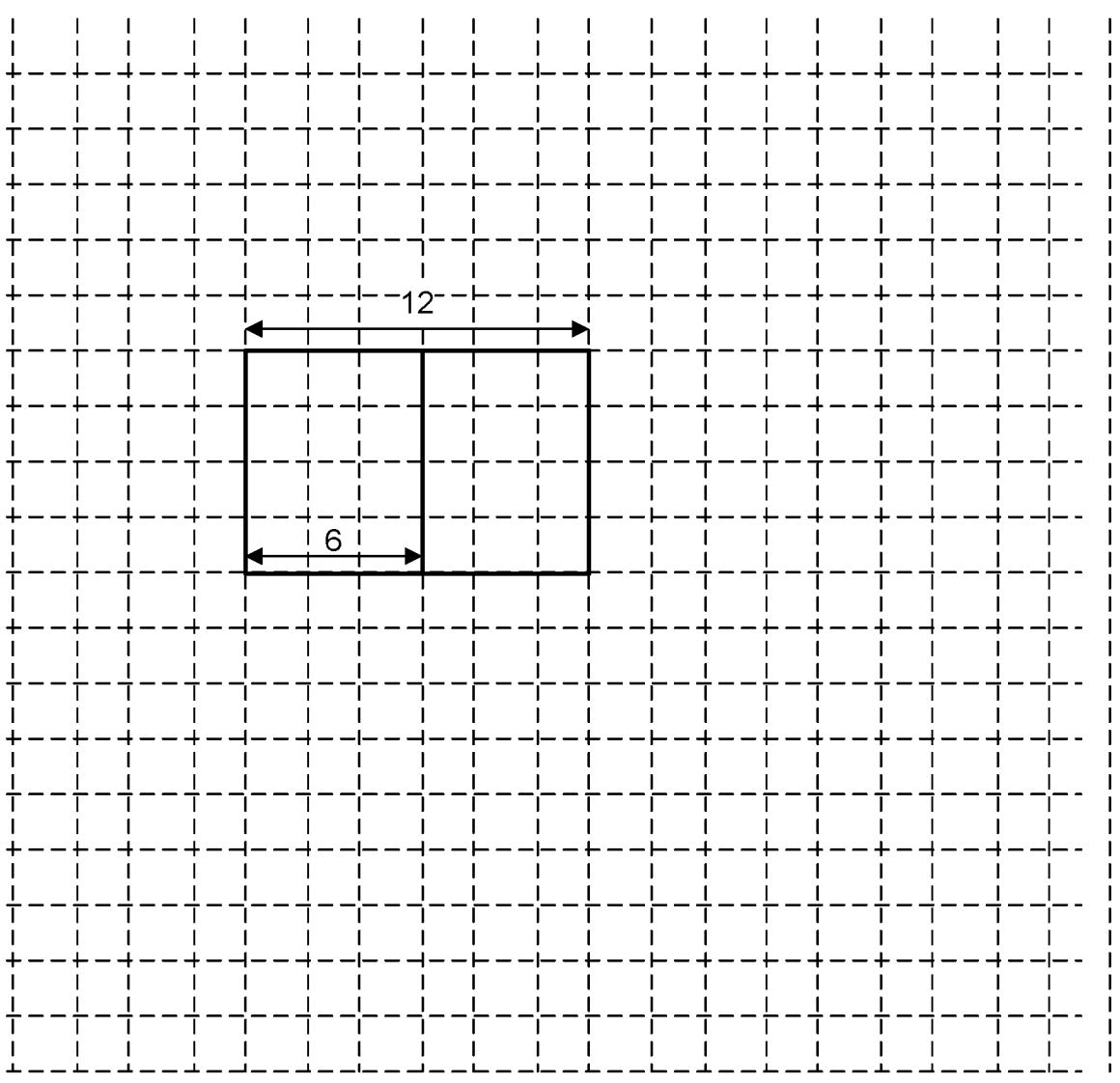
FIG. 29 illustrates a deblocking filtering process on a 2-samples-long vertical and horizontal edge basis.

To solve this improper deblocking filtering issue in the case of TUs with size 6, it is proposed to achieve the deblocking filtering process on a 2-samples-long vertical and horizontal edge basis. This modified deblocking filtering process is illustrated in FIG. 29. As a result, since the new proposed deblocking process achieves a loop on each 2-sample-long vertical and horizontal edge in the picture, the edges of TUs with a size different from a multiple of 4, for example 6, are properly handled by the deblocking filter stage.

Furthermore, in a variant, the SBT split of a CU with size 12 into a TU with a split ratio (¼, ¾) may be normatively allowed. In such cases, this may result in a coded TU with size 3. In such cases, the deblocking filtering process may apply on 1-sample long vertical and horizontal edges rather than 2-samples long edges.

Encoder-Side Fast Rate Distortion Search Methods for ABT

First Encoder Side Speed-Up Proposed.

This section described further embodiments, aiming at fast rate distortion decision for ABT partitioning.

First, according to an embodiment, the rate distortion evaluation of the vertical ABT candidate split modes or the horizontal ABT candidate split mode may be bypassed, according to some spatial activities measured in the original block to code.

To do so, the following horizontal, vertical, downwards and upwards activities are computed in the original blocks as follows:

$$horAct = \sum_{j=0}^{width-1} \sum_{k=0}^{height-1} |\text{block}(j+1, k) - \text{block}(j, k)|$$

$$verAct = \sum_{j=0}^{width-1} \sum_{k=0}^{height-1} |\text{block}(j, k+1) - \text{block}(j, k)|$$

$$downAct = \sum_{j=0}^{width-1} \sum_{k=0}^{height-1} |\text{block}(j+1, k) - \text{block}(j, k+1)|$$

$$upAct = \sum_{j=0}^{width-1} \sum_{k=0}^{height-1} |\text{block}(j+1, k+1) - \text{block}(j, k)|$$

Where block (j, k) represents the original sample value at spatial position (j, k) in the considered coding unit, and th is a constant value equal to 1 if the intra period is different from 1, and 1.2 otherwise.

In the VVC reference software, the horizontal BT and TT split modes are bypassed in the encoder side rate distortion search if the following condition is true:

horAct>th×verAct AND horAct·√2>th×downAct
    AND horAct·√2>th×upAct

According to the present embodiment, the two horizontal ABT split modes (HOR_UP and HOR_DOWN) are also bypassed in the encoder side rate distortion search if the above condition is true.

Moreover, in the WC reference software, the horizontal BT and TT split modes are bypassed in the encoder side rate distortion search if the following condition is true:

verAct>th×horAct AND verAct·√2>th×downAct
    AND verAct·√2>th×upAct

According to the present embodiment, the two vertical ABT split modes (VER_UP and VER_DOWN) are also bypassed in the encoder side rate distortion search if the above condition is true.

Second Encoder Side Speed Up Proposed

In the VVC reference software, an encoder speed-up method is used to bypass the rate distortion evaluation of the horizontal TT split and vertical TT split, which proceeds as follows.

For a current CU being process with size (width, height), the following applies.

If the horizontal BT split has just been evaluated and the rate distortion search leads to a division of the current CU where either the first sub-CU or the last sub-CU has a height lower than height/2 and if the current multi-type tree depth of current CU is equal to (maxMtDepth−1), then the horizontal TT split is not evaluated by the rate distortion search. Here, maxMtDepth is the maximum allowed multi-type tree depth for current coding tree.

Similarly, if the vertical BT split has just been evaluated and the rate distortion search leads to a block division of the current CU where either the first sub-CU or the last sub-CU has a width lower than width/2 and if the current multi-type tree depth of current CU is equal to (maxMtDepth−1) then the vertical TT split is not evaluated by the rate distortion search.

Figure 23:
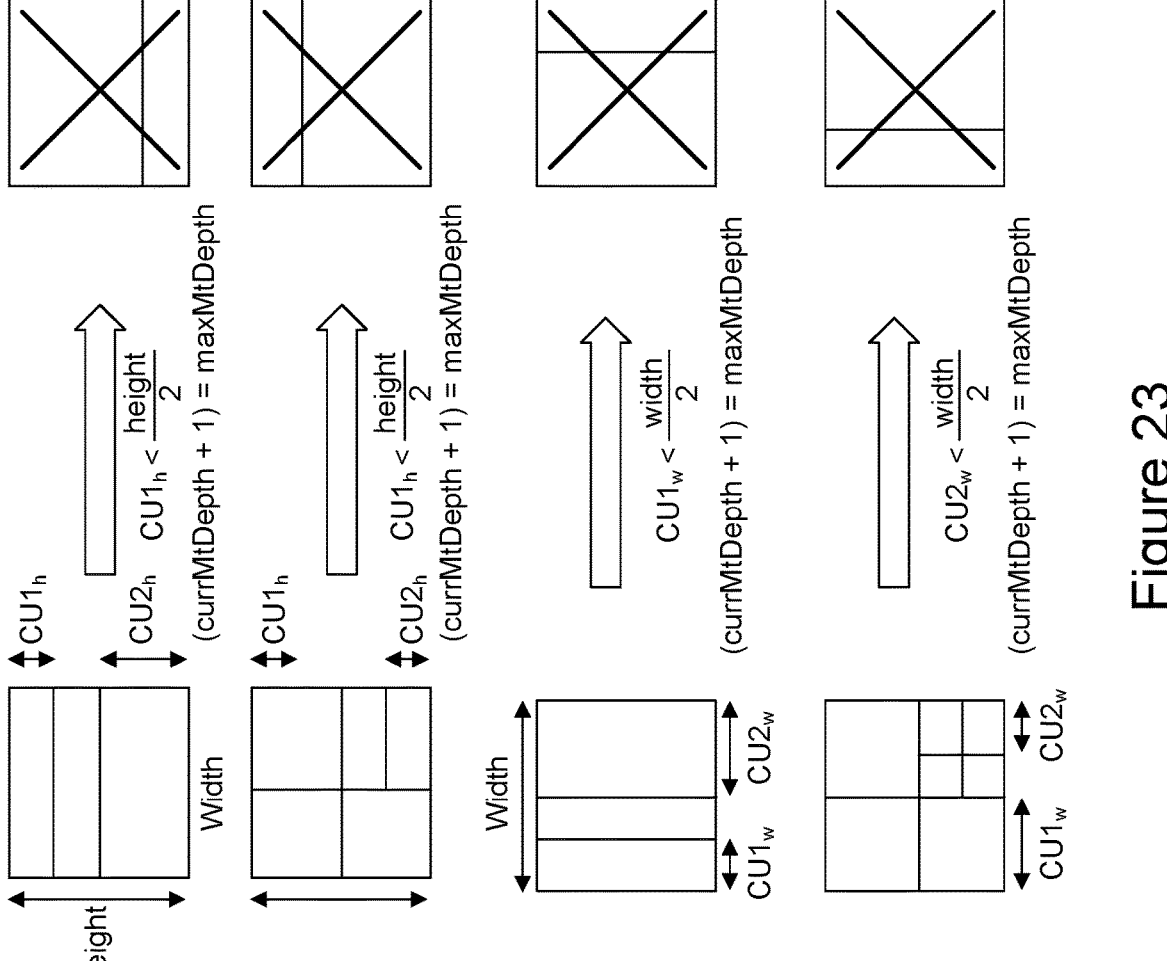
FIG. 23 illustrates proposed encoder-side speed up for ABT rate distortion search.

In the present embodiment, the above method is adapted to ABT splitting as follows. The principle of it is depicted by FIG. 23.

If the horizontal BT or TT split has just been evaluated and the rate distortion search leads to a division of the current CU where the first sub-CU has a height lower than height/2 and if the current multi-type tree depth of current CU is equal to (maxMtDepth−1), then the ABT split mode HOR_DOWN split is not evaluated by the rate distortion search for current CU. See first example on FIG. 23.

If the horizontal BT or TT split has just been evaluated and the rate distortion search leads to a division of the current CU where the last sub-CU has a height lower than height/2 and if the current multi-type tree depth of current CU is equal to (maxMtDepth−1), then the ABT split mode HOR_UP split is not evaluated by the rate distortion search for current CU. See second example on FIG. 23.

If the vertical BT or TT split has just been evaluated and the rate distortion search leads to a division of the current CU where the first sub-CU has a width lower than width/2 and if the current multi-type tree depth of current CU is equal to (maxMtDepth−1), then the ABT split mode VER_RIGHT split is not evaluated by the rate distortion search for current CU. See third example in FIG. 23.

If the vertical BT or TT split has just been evaluated and the rate distortion search leads to a division of the current CU where the last sub-CU has a width lower than width/2 and if the current multi-type tree depth of current CU is equal to (maxMtDepth−1), then the ABT split mode VER_LEFT split is not evaluated by the rate distortion search for current CU. See fourth example in FIG. 23.

Figure 24:
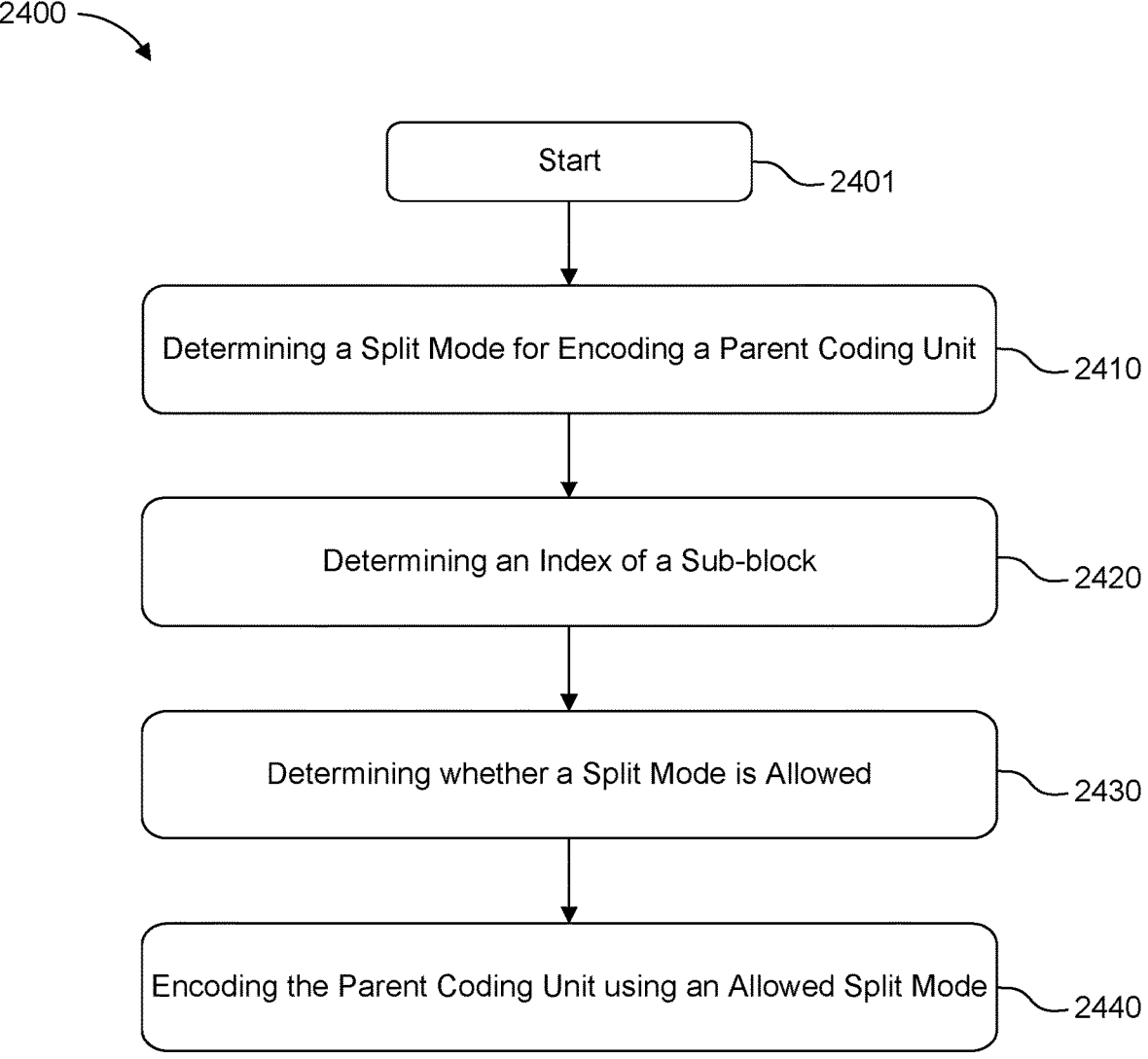
FIG. 24 illustrates one embodiment of a method under the general described aspects.

One embodiment of a method 2400 under the general aspects described here is shown in FIG. 24. The method commences at start block 2401 and control proceeds to block 2410 for determining a split mode for encoding a parent coding unit. Control proceeds from block 2410 to block 2420 for determining an index of a sub-block of the parent coding unit. Control proceeds from block 2420 to block 2430 for determining whether a split mode is allowed based on factors comprising the split mode for the parent coding unit and the index of the sub-block of the parent coding unit. Control proceeds from block 2430 to block 2440 for encoding the parent coding unit using a split mode that is allowed.

Figure 25:
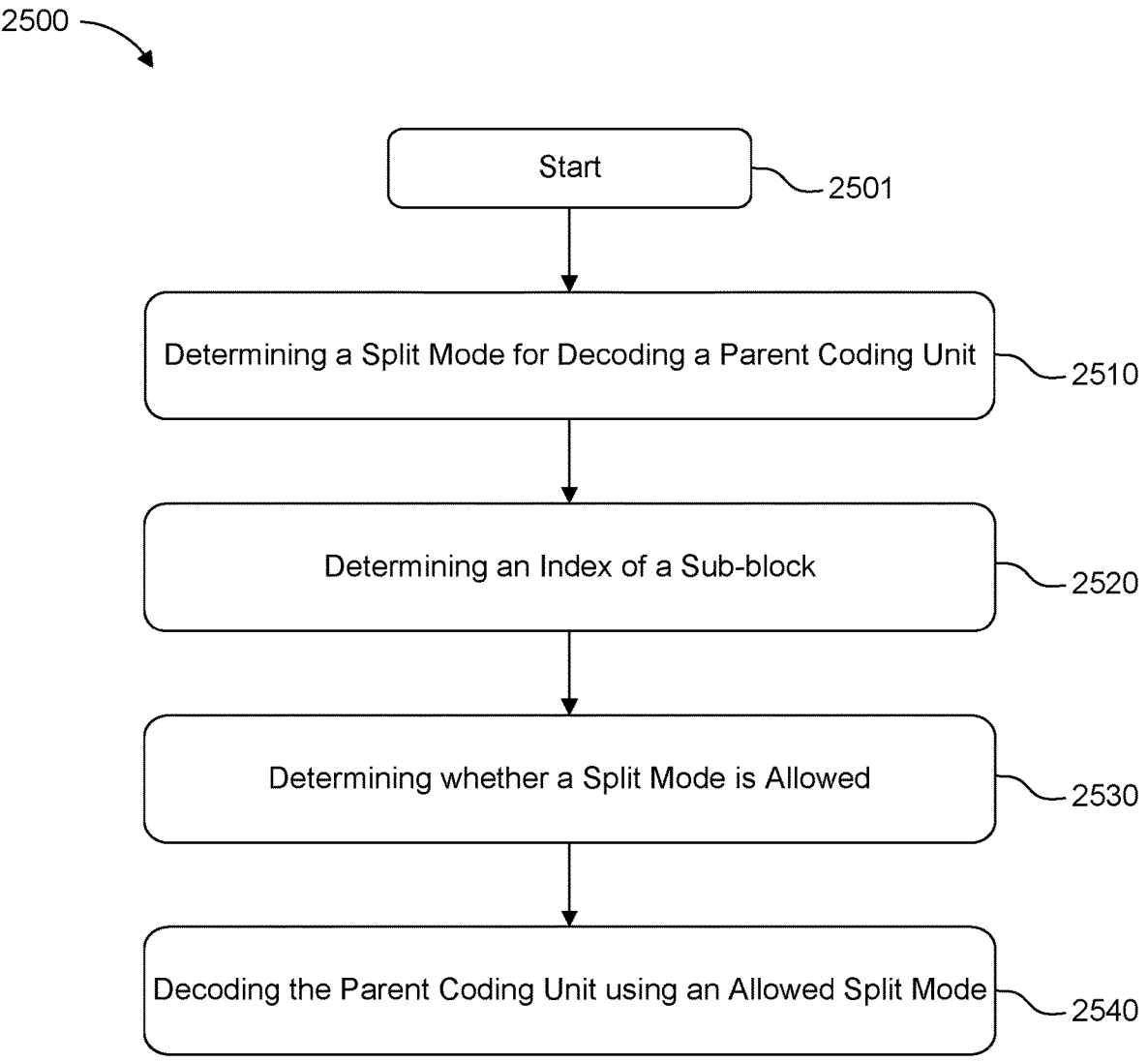
FIG. 25 illustrates another embodiment of a method under the general described aspects.

A second embodiment of a method 2500 under the general aspects described here is shown in FIG. 25. The method commences at start block 2501 and control proceeds to block 2510 for determining a split mode for decoding a parent coding unit. Control proceeds from block 2510 to block 2520 for determining an index of a sub-block of the parent coding unit. Control proceeds from block 2520 to block 2530 for determining whether a split mode is allowed based on factors comprising the split mode for the parent coding unit and the index of the sub-block of the parent coding unit. Control proceeds from block 2530 to block 2540 for decoding the parent coding unit using a split mode that is allowed.

Figure 26:
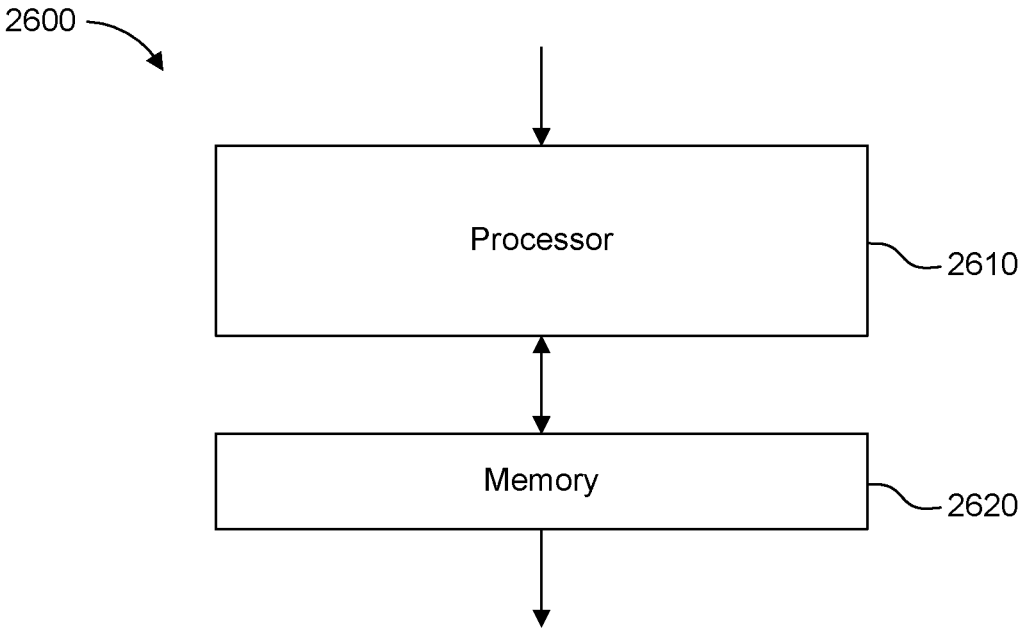
FIG. 26 illustrates an example apparatus under the described aspects.

FIG. 26 shows one embodiment of an apparatus 2600 for encoding, decoding, compressing or decompressing video data using simplifications of coding modes based on neighboring samples dependent parametric models. The apparatus comprises Processor 2610 and can be interconnected to a memory 2620 through at least one port. Both Processor 2610 and memory 2620 can also have one or more additional interconnections to external connections.

Processor 2610 is also configured to either insert or receive information in a bitstream and, either compressing, encoding or decoding using any of the described aspects.

The embodiments described here include a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 27:
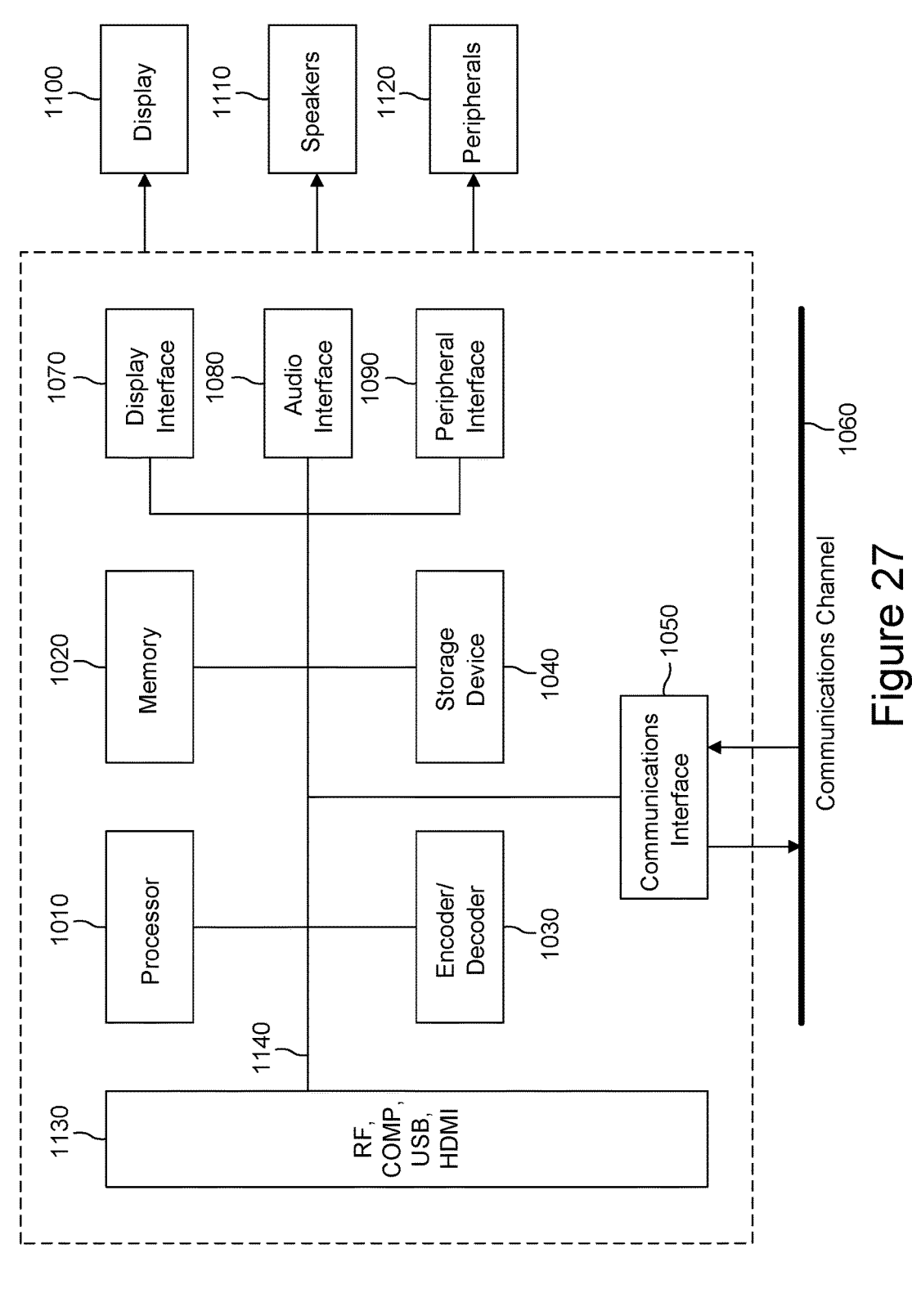
FIG. 27 illustrates a processor based system for encoding/decoding under the general described aspects.

The aspects described and contemplated in this application can be implemented in many different forms. FIGS. 10, 11, and 27 provide some embodiments, but other embodiments are contemplated and the discussion of FIGS. 10, 11, and 27 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 10 and FIG. 11. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 10 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 11 illustrates a block diagram of a video decoder 200. In the decoder 200, a bitstream is decoded by the decoder elements as described below. Video decoder 200 generally performs a decoding pass reciprocal to the encoding pass as described in FIG. 10. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YcbCr 4:2:0 to RGB 4:4:4) or an inverse remapping performing the inverse of the remapping process performed in the pre-encoding processing (101).

The post-decoding processing can use metadata derived in the pre-encoding processing and signaled in the bitstream.

FIG. 27 illustrates a block diagram of an example of a system in which various aspects and embodiments are implemented. System 1000 can be embodied as a device including the various components described below and is configured to perform one or more of the aspects described in this document. Examples of such devices include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 27, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface Ics or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or another device. The display 1100 can also be integrated with other components (for example, as in a smart phone), or separate (for example, an external monitor for a laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

Forbidding some asymmetric binary tree splits based on factors comprising split mode for a parent coding unit and an index of a sub-block of the parent coding unit.

The above embodiment wherein split modes comprise horizontal up, horizontal down, vertical left, and vertical right.

Conditioning the allowed splits based on factors comprising transform size, block size, temporal layer of a slice and slice type.

Conditioning the allowed splits based on syntax in a bitstream.

Any of the above embodiments wherein allowable splits are implemented on an encoder side only.

Any of the above embodiments wherein a maximum ABT size is defined as the maximum coding unit size, in width or height, where ABT splitting is allowed.

Any of the above embodiments wherein a maximum ABT size parameter is set to a value larger than 64×64.

Any of the above embodiments wherein luminance mapping chroma scaling is performed with a template region over which an average reconstructed luma is computed may consist in top and left samples around a 128×128 luma region comprising the current.

Any of the above embodiments wherein a maximum sub-block transform size is fixed as a minimum of 64 or a maximum transform block size.

Inserting in the signaling syntax elements that enable the decoder to determine decoding information in a manner corresponding to that used by an encoder.

Creating and/or transmitting and/or receiving and/or decoding a bitstream or signal that includes one or more of the described syntax elements, or variations thereof.

A TV, set-top box, cell phone, tablet, or other electronic device that performs transform method(s) according to any of the embodiments described.

A TV, set-top box, cell phone, tablet, or other electronic device that performs transform method(s) determination according to any of the embodiments described, and that displays (e.g. using a monitor, screen, or other type of display) a resulting image.

A TV, set-top box, cell phone, tablet, or other electronic device that selects, bandlimits, or tunes (e.g. using a tuner) a channel to receive a signal including an encoded image, and performs transform method(s) according to any of the embodiments described.

A TV, set-top box, cell phone, tablet, or other electronic device that receives (e.g. using an antenna) a signal over the air that includes an encoded image, and performs transform method(s).

The invention claimed is:

1. A method, comprising:
determining an asymmetric binary tree split mode for encoding a parent coding unit;
determining an index of a sub-block of the parent coding unit;
determining whether a split mode is allowed based on factors comprising the asymmetric binary tree split mode for the parent coding unit and the index of the sub-block of the parent coding unit; and
encoding the parent coding unit using the split mode that is allowed.

2. An apparatus, comprising:
a processor, configured to perform:
determine an asymmetric binary tree split mode for encoding a parent coding unit;
determine an index of a sub-block of the parent coding unit;
determine whether a split mode is allowed based on factors comprising the asymmetric binary tree split mode for the parent coding unit and the index of the sub-block of the parent coding unit; and
encode the parent coding unit using the split mode that is allowed.

3. A method, comprising:
determining an asymmetric binary tree split mode for decoding a parent coding unit;
determining an index of a sub-block of the parent coding unit;

determining whether a split mode is allowed based on factors comprising the asymmetric binary tree split mode for the parent coding unit and the index of the sub-block of the parent coding unit; and
decoding the parent coding unit using the split mode that is allowed.

4. An apparatus, comprising:
a processor, configured to:
determine an asymmetric binary tree split mode for decoding a parent coding unit;
determine an index of a sub-block of the parent coding unit;
determine whether a split mode is allowed based on factors comprising the asymmetric binary tree split mode for the parent coding unit and the index of the sub-block of the parent coding unit; and
decode the parent coding unit using the split mode that is allowed.

5. The method of claim 1, wherein said factors further comprise transform size.

6. The method of claim 1, wherein said factors further comprise block size which are signaled in syntax.

7. The method of claim 1, wherein said factors further comprise temporal layer of a slice and slice type.

8. The method of claim 1, wherein syntax is used to configure usage of partitioning in a luma component of an intra slice when dual tree is used.

9. The apparatus of claim 2, wherein a virtual pipeline decoding unit size is dynamically altered based on a maximum transform block size, a maximum asymmetric binary tree size and a maximum ternary tree size.

10. The apparatus of claim 2, wherein a joint luma/chroma coding tree is replaced by a dual coding tree for a quad-tree node size that is configurable.

11. The apparatus of claim 2, wherein a flag indicates whether a maximum transform size is one of two values.

12. The method of claim 3, wherein said factors further comprise transform size.

13. The method of claim 3, wherein said factors further comprise block size which are signaled in syntax.

14. The method of claim 3, wherein said factors further comprise temporal layer of a slice and slice type.

15. The apparatus of claim 4, wherein syntax is used to configure usage of partitioning in a luma component of an intra slice when dual tree is used.

16. The apparatus of claim 4, wherein a virtual pipeline decoding unit size is dynamically altered based on a maximum transform block size, a maximum asymmetric binary tree size and a maximum ternary tree size.

17. The apparatus of claim 4, wherein a joint luma/chroma coding tree is replaced by a dual coding tree for a quad-tree node size that is configurable.

* * * * *